United States Patent
Volk et al.

(10) Patent No.: US 7,774,923 B2
(45) Date of Patent: Aug. 17, 2010

(54) METHOD OF FABRICATING CARTRIDGE FOR MINIATURE OPTICAL DATA STORAGE DISC

(75) Inventors: Steven B. Volk, Boulder, CO (US); Gregory Dimitri Volan, Longmont, CO (US); Rene D. Kumar Anirudhan, Lafayette, CO (US); PK Bala, Lafayette, CO (US)

(73) Assignee: Vmedia Research, Inc., Boulder, CO (US)

( * ) Notice: Subject to any disclaimer, the term of this patent is extended or adjusted under 35 U.S.C. 154(b) by 138 days.

(21) Appl. No.: 11/982,018

(22) Filed: Nov. 1, 2007

(65) Prior Publication Data

US 2008/0282282 A1 Nov. 13, 2008

Related U.S. Application Data

(60) Division of application No. 11/209,553, filed on Aug. 22, 2005, now Pat. No. 7,603,681, which is a continuation-in-part of application No. 10/423,097, filed on Apr. 25, 2003, now Pat. No. 7,013,476.

(51) Int. Cl.
*G11B 5/127* (2006.01)
*H04R 31/00* (2006.01)

(52) U.S. Cl. .............. 29/603.03; 29/603.04; 29/603.06; 29/603.07; 29/737; 720/725; 720/734; 720/738; 720/739; 720/741

(58) Field of Classification Search .............. 29/603.03, 29/603.04, 603.06, 737; 720/725, 734, 738, 720/739, 741, 744
See application file for complete search history.

(56) References Cited

U.S. PATENT DOCUMENTS

| | | | | |
|---|---|---|---|---|
| 5,140,489 | A | 8/1992 | Bernard | 360/133 |
| 5,475,674 | A | 12/1995 | Yamashita et al. | 720/735 |
| 5,974,024 | A | 10/1999 | Konishi et al. | 369/282 |
| 6,154,441 | A | 11/2000 | Sandstrom et al. | 369/282 |
| 6,198,598 | B1 * | 3/2001 | Meguro | 360/133 |
| 6,236,540 | B1 | 5/2001 | Meguro | 360/133 |
| 6,298,533 | B1 | 10/2001 | Nishimura et al. | 29/243.5 |
| 6,307,710 | B1 * | 10/2001 | Nelson | 360/133 |
| 6,515,830 | B1 | 2/2003 | Meguro | 360/133 |
| 6,665,261 | B2 | 12/2003 | Okamoto et al. | 720/738 |
| 6,687,215 | B1 | 2/2004 | Bagnell et al. | 720/740 |

(Continued)

FOREIGN PATENT DOCUMENTS

JP 07320359 12/1995

(Continued)

*Primary Examiner*—Paul D Kim
(74) *Attorney, Agent, or Firm*—Patentability Associates

(57) ABSTRACT

A method of fabricating a cartridge for an optical data storage disc includes attaching a plastic shell and a sheet metal cover plate. The shell includes lateral walls and a floor that together define a disc cavity and a plurality of assembly posts. The sheet metal cover plate includes a plurality of holes. To attach the cover plate to the shell, the assembly posts are inserted into the holes, and the ends of the assembly posts are heated to form mushroom caps which hold the cover plate against the shell. The optical disc is housed in the disc cavity, with the data side of the disc facing the cover plate. A sheet metal shutter is wrapped around an edge of the cartridge and over the shell and cover plate.

6 Claims, 34 Drawing Sheets

U.S. PATENT DOCUMENTS

| | | |
|---|---|---|
| 6,779,194 B2 | 8/2004 | Okamoto et al. ............ 720/725 |
| 6,831,888 B2 | 12/2004 | Roberts ...................... 720/728 |
| 6,971,117 B2 | 11/2005 | Okazawa et al. ............ 720/738 |
| 7,013,476 B2 | 3/2006 | Volk et al. ................... 720/726 |
| 2002/0021639 A1 | 2/2002 | Obata et al. ................ 369/52.1 |
| 2004/0085723 A1* | 5/2004 | Hartung ...................... 361/684 |
| 2006/0048167 A1 | 3/2006 | Volk et al. |

FOREIGN PATENT DOCUMENTS

| | | |
|---|---|---|
| JP | 08194977 | 7/1996 |
| JP | 10144031 | 5/1998 |
| JP | 2001076456 | 3/2001 |
| JP | 2001236755 | 8/2001 |

* cited by examiner

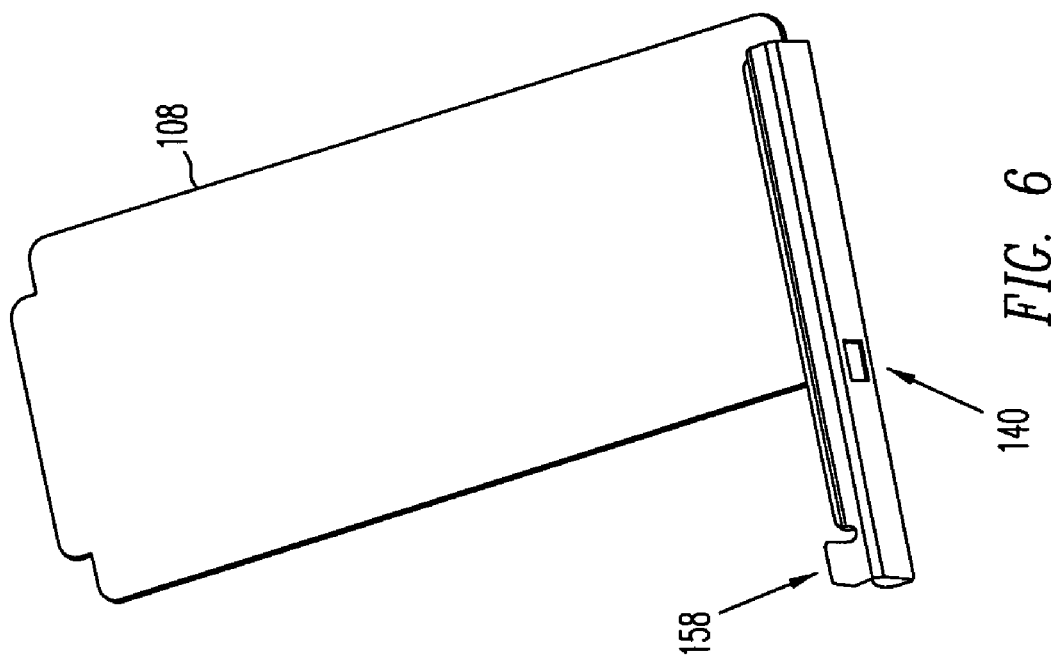
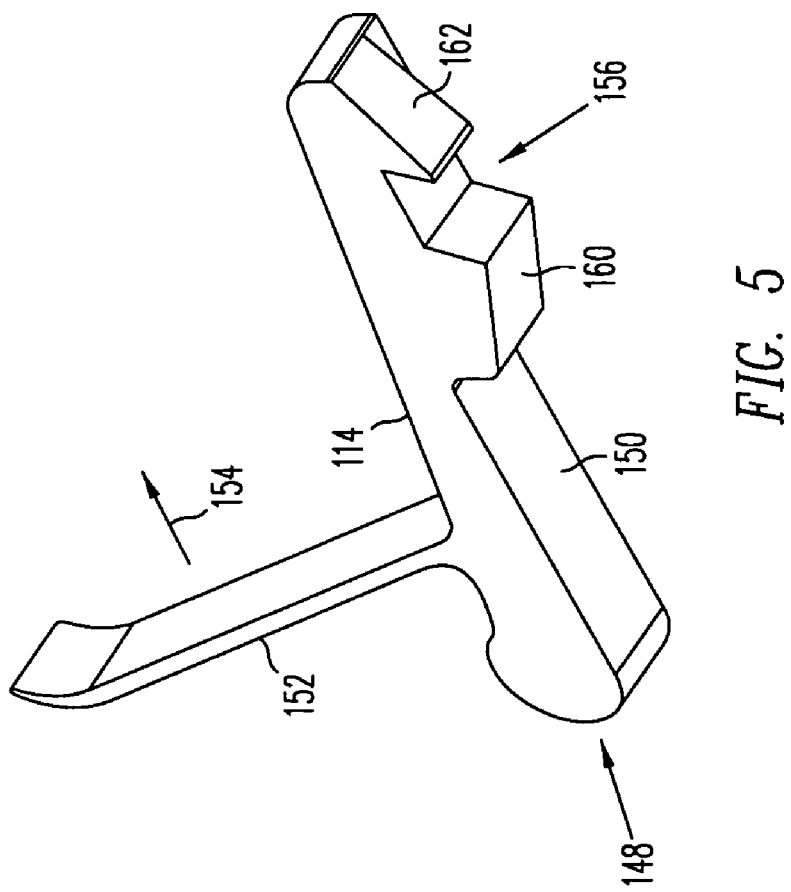

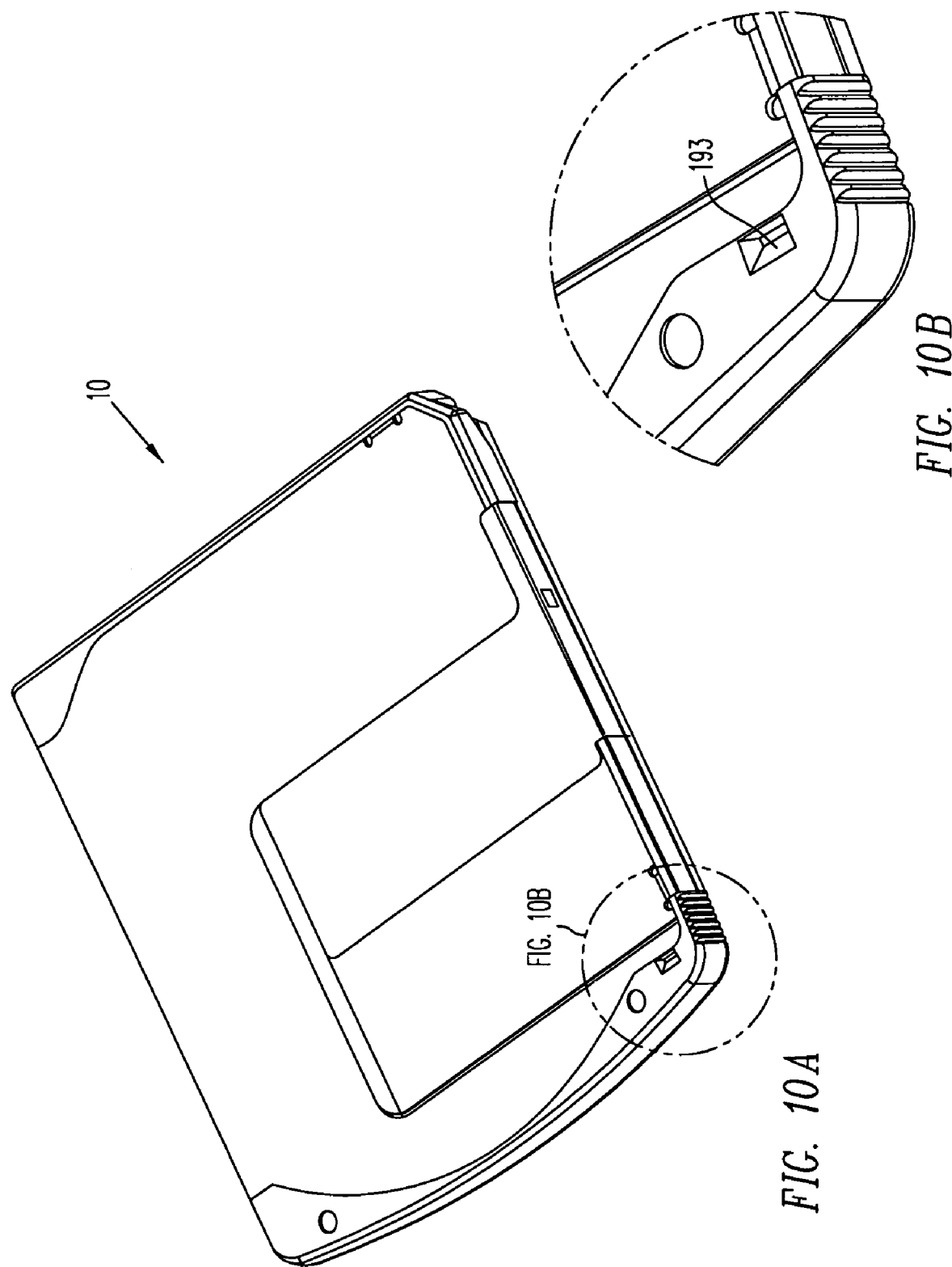

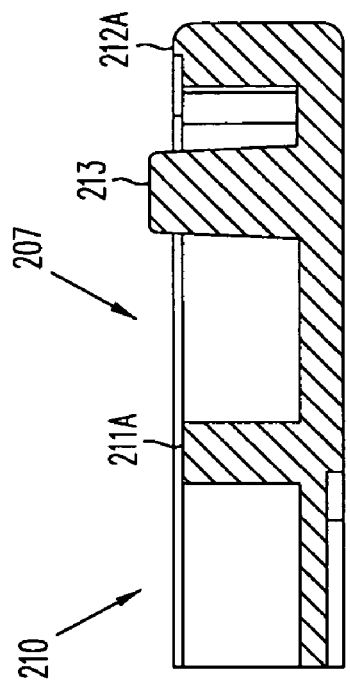
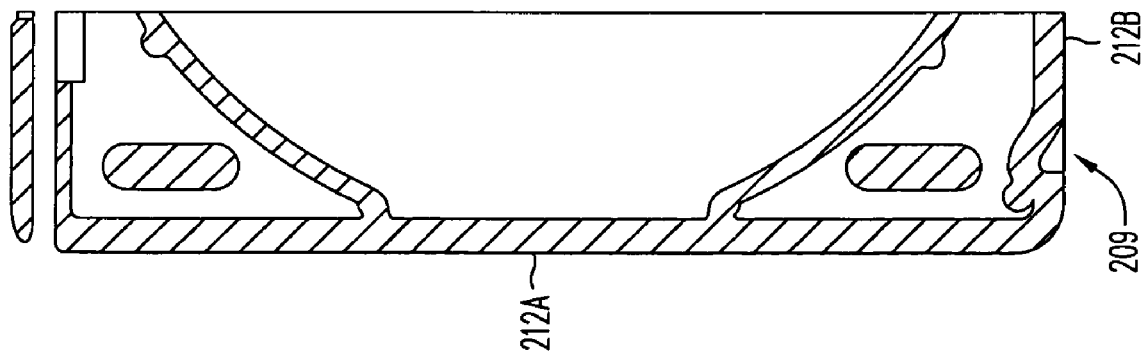
FIG. 12D
FIG. 12C

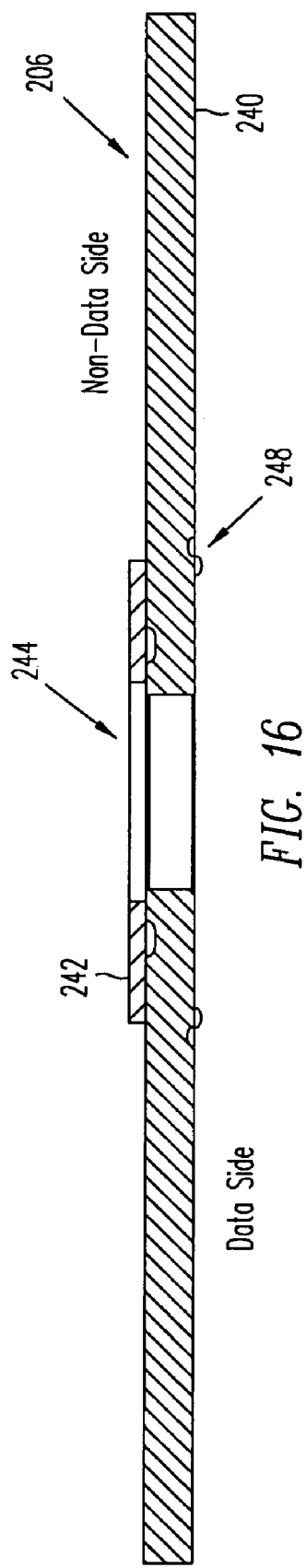
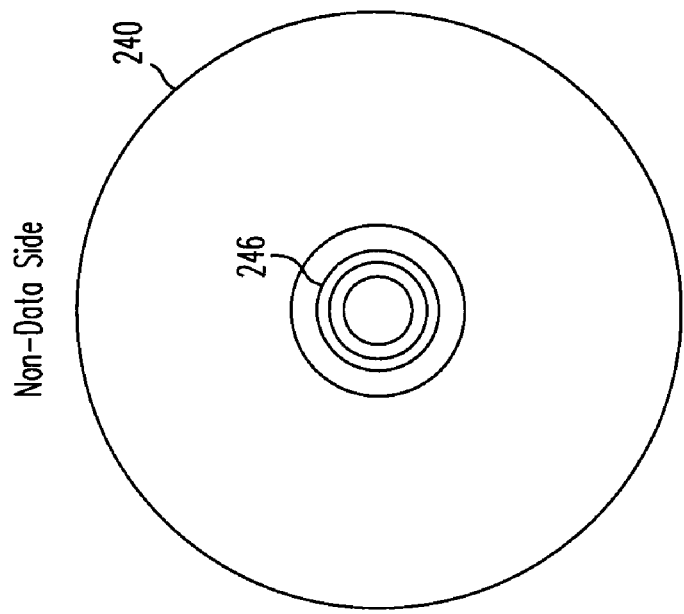
FIG. 17B
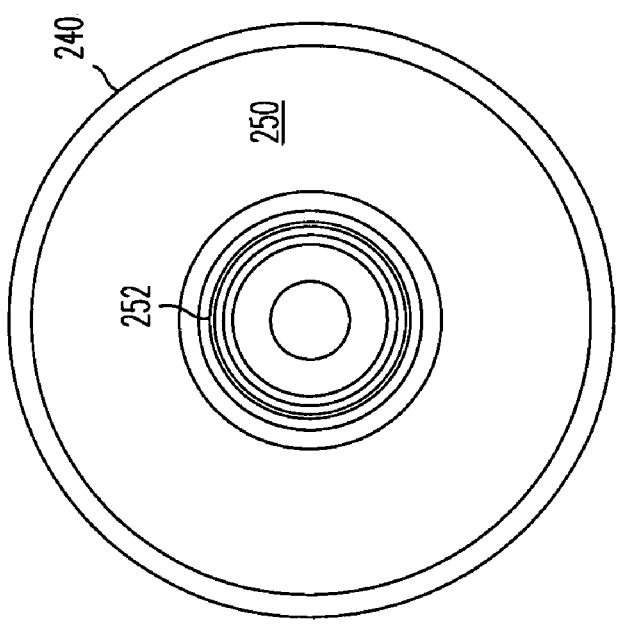
FIG. 17A

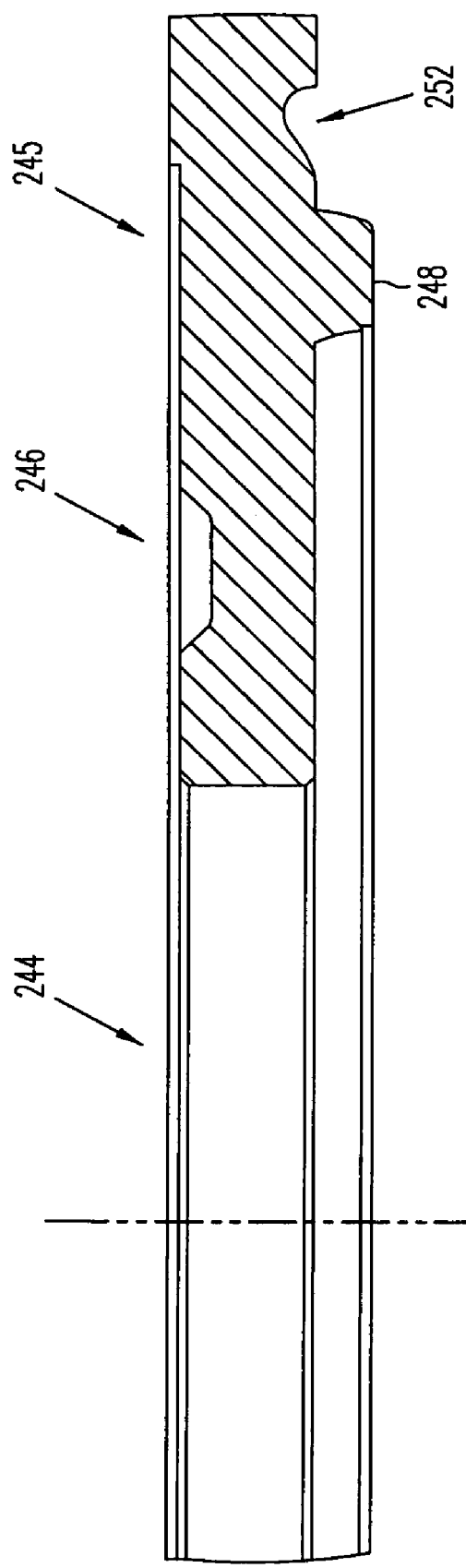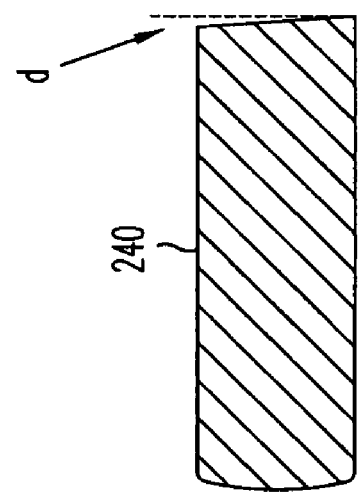
FIG. 18A
FIG. 18B

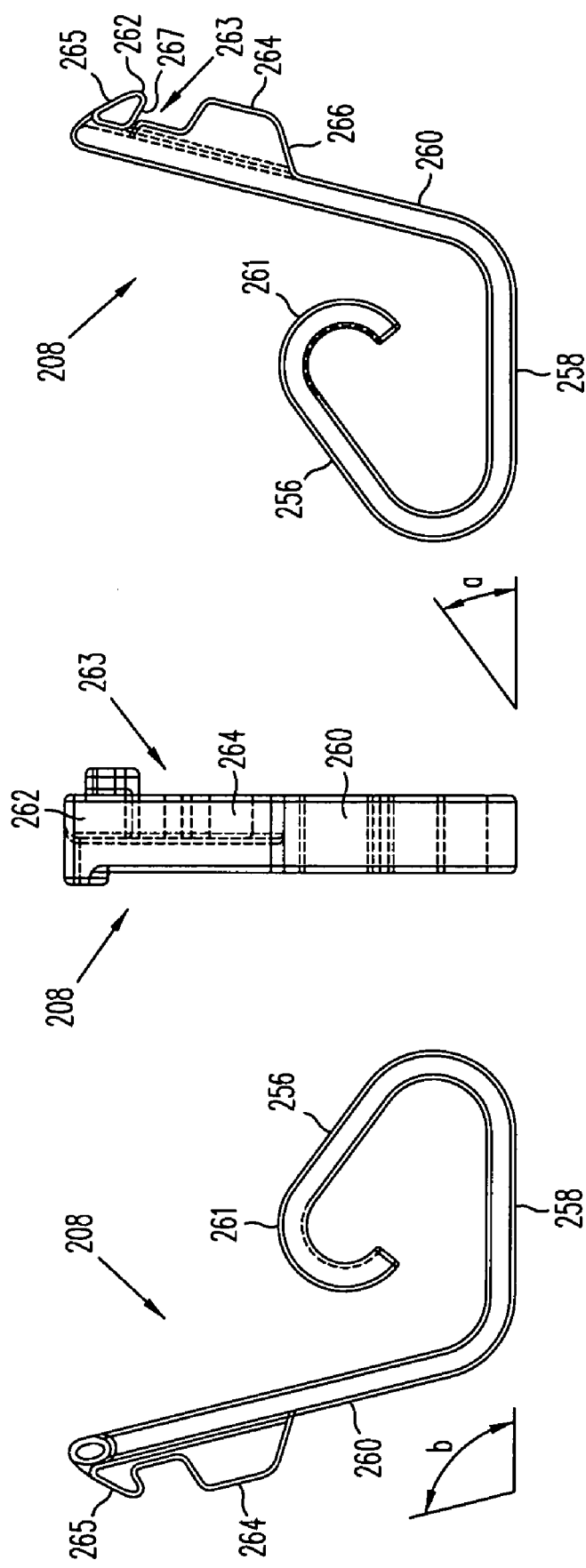

METHOD OF FABRICATING CARTRIDGE FOR MINIATURE OPTICAL DATA STORAGE DISC

CROSS-REFERENCE TO RELATED APPLICATIONS

This application is a divisional of application Ser. No. 11/209,553, filed Aug. 22, 2005, which is a continuation-in-part of application Ser. No. 10/423,097, filed Apr. 25, 2003, now U.S. Pat. No. 7,013,476, each of which is incorporated herein by reference in its entirety.

This application is related to application Ser. No. 10/423,701, filed Apr. 25, 2003, now U.S. Pat. No. 7,058,959, which is incorporated herein by reference in its entirety.

FIELD OF THE INVENTION

This invention relates to high-volume data storage and, in particular, to a cartridge for an optical data storage disc that is compatible with an industry-standard memory card slot in a portable computing device.

BACKGROUND OF THE INVENTION

Consumer entertainment technologies are moving towards high resolution color displays for mobile entertainment. Increasingly, consumers want to take their entertainment with them. Cross-country travelers and cross-town commuters are eagerly pursuing gaming, music and video entertainment activities on cell phones, personal digital assistants (PDAs) and portable computers. At present, however, the entertainment experience is limited, even primitive, compared to what consumers have come to expect from their game consoles, home theaters and DVD-equipped computers.

The main problem is data storage. The fact is that sophisticated digital entertainment is data-intensive, and it is growing more so every day. Traditional small "form factor," portable media such as CompactFlash® cards, SD flash cards, Memory Stick™ and other solid state memory devices simply cannot deliver the capacity and price per megabyte required for a high-quality entertainment experience. Recording content onto solid state memory cards in high volume is expensive and impractical, and securing that content effectively is very difficult.

While some experts predict that broadband Internet access will deliver high-quality games and movies to mobile consumer electronics devices, there are significant barriers to success. Cell phone networks are designed to transmit voice communications and are simply not efficient for high-capacity data transmission. Cell connections are not capable of the required speeds and are notoriously unreliable, with frequent dead zones and dropped connections. While games are being delivered to cell phones currently, the quality of game play and the game environment cannot begin to approach that of a console.

WiFi, or 802.11, wireless is designed for data transmission, and the growing of WiFi hotspots looks attractive on the surface for delivering large amounts of data to mobile devices. Internet access and email application for multiple users are easily accommodated by WiFi. Nonetheless, managing streaming and interactive content such as multiplayer games and high-quality video or movies for thousands, if not millions, of users simultaneously will be challenging for any network. Security is also a problem for WiFi, leaving content providers open to potential pirating activities.

Moreover, the data storage problem would still exist. For any sort of networked delivery system to be viable, mobile consumer devices will have to embed significant amounts of storage to hold large, downloaded game and movie files, and to track a player's progress within the game. Perhaps the most significant problem for networked content delivery is cost. It has been estimated that it can cost more than $30 to send a DVD-quality film over the Internet.

Disc-based distribution costs are far lower. Even more compelling is the fact that consumers have consistently demonstrated their preference for purchasing high-value content on discs, as evidenced by the recent upswing in DVD sales.

Clearly, the mobile entertainment industry needs an economical, small form factor, secure storage technology to meet the growing demand for a portable, high-quality entertainment experience. In addition, it is anticipated that a storage device capable of holding large amounts of data would find application in other areas, such as in portable computers used in connection with the homeland security effort.

SUMMARY OF THE INVENTION

A first embodiment of a cartridge in accordance with this invention includes a sheet metal sheath and an insert, preferably made of plastic. The sheath is made from a sheet of sheet metal that is preferably folded back on itself to form wall portions on opposite sides of a bend area. An insert, preferably made of plastic, is inserted into the sheath, and the wall portions are attached to each other, for example by spot welding, to form a small, structurally sound unit. The insert has an opening into which a data storage disc is placed. The disc is preferably hubless and accessible by a spindle through an opening in the sheath. One of the wall portions has a window which allows access to the data area of the disc and a shutter which covers the window and protects the disc when the cartridge is not inside a disc drive.

Using a metal sheath allows the cartridge assembly to be made very thin (e.g., 2.8 mm or less thick) without compromising its structural integrity. With this structure, the cartridge can provide large amounts of data (e.g., 2 Gbytes or more) to a small, industry-standard slot that is generally designed for use with a data card. One example is the CompactFlash® slot that is used in many PDAs and other small computers. Spot-welding the wall portions to each other can be performed very quickly without adhesives or the associated cure time.

Ideally, the cartridge of this invention is used with a disc drive of the type described in the above-referenced application Ser. No. 10/423,701.

In a second embodiment of this invention, the cartridge comprises a monolithic shell formed to define a disc cavity. The shell is preferably made of plastic. The disc cavity is bounded by a floor and lateral walls, and the lateral walls laterally enclose the disc cavity. An optical data storage disc is located in the disc cavity. A sheet metal cover plate abuts the top surfaces of the lateral walls. A shutter window is formed in the cover plate, and a sheet metal shutter is wrapped around an edge of the cartridge. The shutter includes a protective flap adjacent the cover plate. The shutter is slideable along the edge of the cartridge between an open position wherein a portion of the optical disc is exposed through the shutter window and a closed position wherein the protective flap overlies the shutter window to conceal the optical disc.

Thus, one principal surface and the edge of the disc are enclosed by the shell and the other principal surface of the disc is covered by the cover plate.

The disc is housed in the disc cavity with its data side facing the cover plate and its non-data side facing the shell. The shutter window formed in the cover plate allows a portion of the data area and the center hole of the disc to be exposed. The shutter includes a clamping flap that joined to the protective flap by an edge wall. The clamping flap is located adjacent the shell.

The disc preferably has a magnetic retainer ring bonded to its non-data side around its center hole. The disc is clamped to the shaft of a spindle motor in a disc drive by means of the magnetic retainer.

A plastic latch, housed in a latch cavity in the shell, holds the shutter in a position which covers the window in the cover plate when the cartridge is not in a disc drive. When the cartridge is inserted into a disc drive, a picker arm in the disc drive releases the latch and allows the shutter to open, exposing the data area and center hole of the disc.

A cartridge of the second embodiment is relatively inexpensive to manufacture and provides a structurally robust enclosure for protecting an optical disc. The use of a relatively thin sheet metal cover sheet on the data side of the disc allows the optical pickup unit (OPU) in a disc drive to read data from the disc using very short wavelength radiation, such as a 405 nm blue laser light.

BRIEF DESCRIPTION OF THE DRAWINGS

FIG. 5 is a detailed view of the latch.

FIG. 6 is a detailed view of the shutter.

FIGS. 10A and 10B show the location of the retention recess on the cartridge.

FIG. 12C illustrates a portion of the shell.

FIG. 12D is a cross-sectional view taken at section line 12D-12D in FIG. 12B.

FIG. 16 is a cross-sectional view of the disc assembly in the second embodiment.

FIGS. 17A and 17B are top views of the disc assembly from the data side and the non-data side, respectively.

FIGS. 18A and 18B are cross-sectional views of the center region and the edge region, respectively, of the optical disc.

FIGS. 20A and 20C are top and bottom views, respectively, of the latch in the second embodiment.

FIG. 20B is a side view of the latch.

DESCRIPTION OF THE INVENTION

Figure 1A:
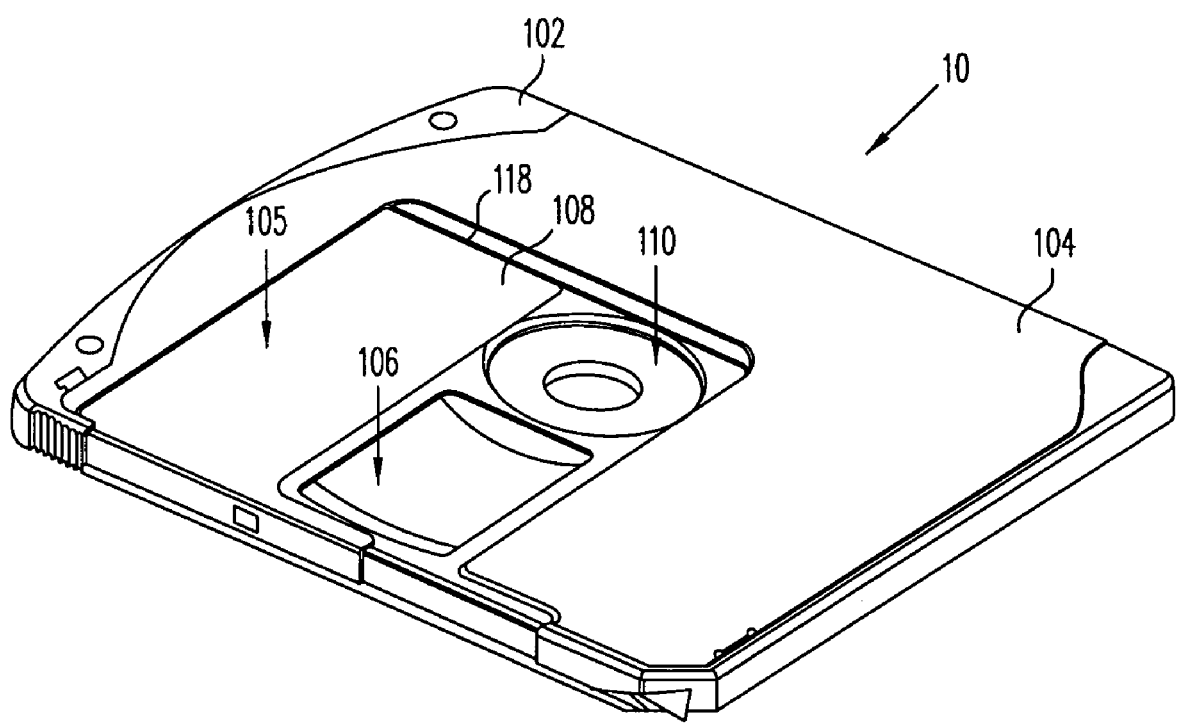
FIGS. 1A and 1B are perspective views of the top and bottom, respectively, of the cartridge of this invention.
Figure 1B:
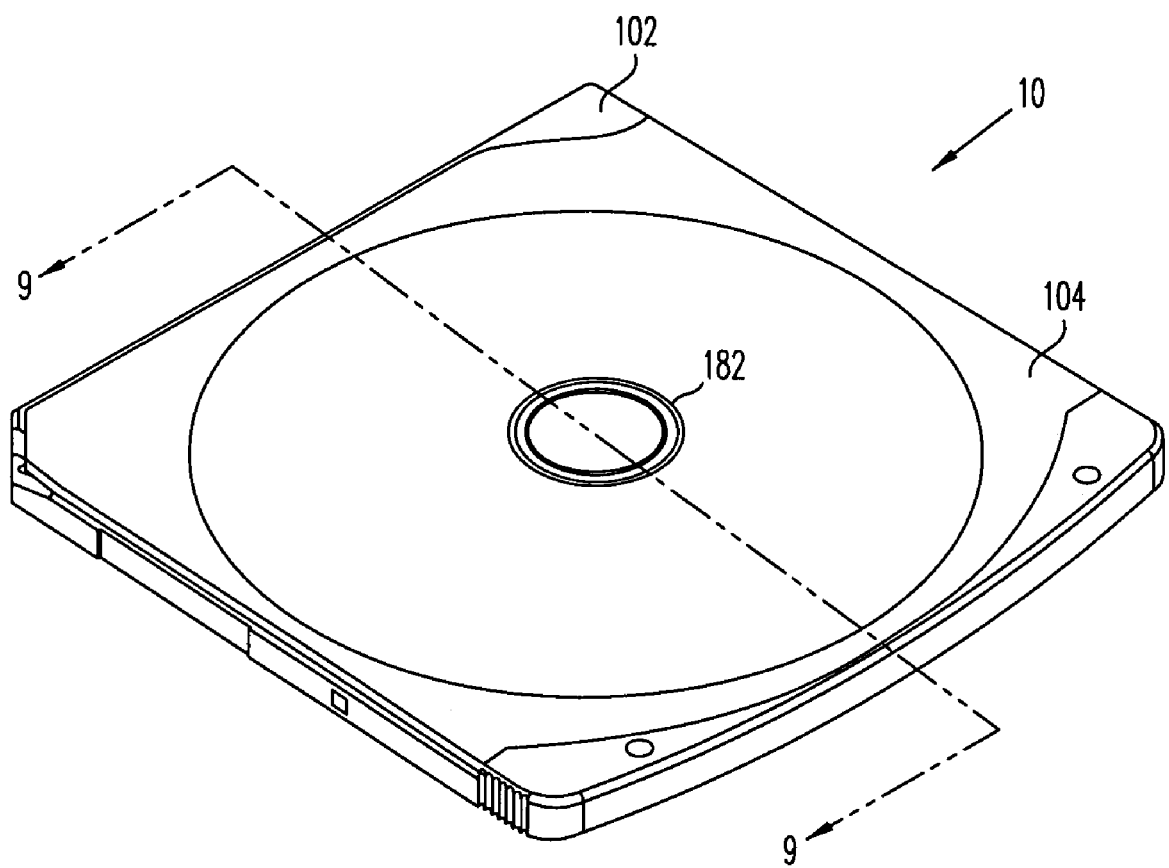
Figure 2A:
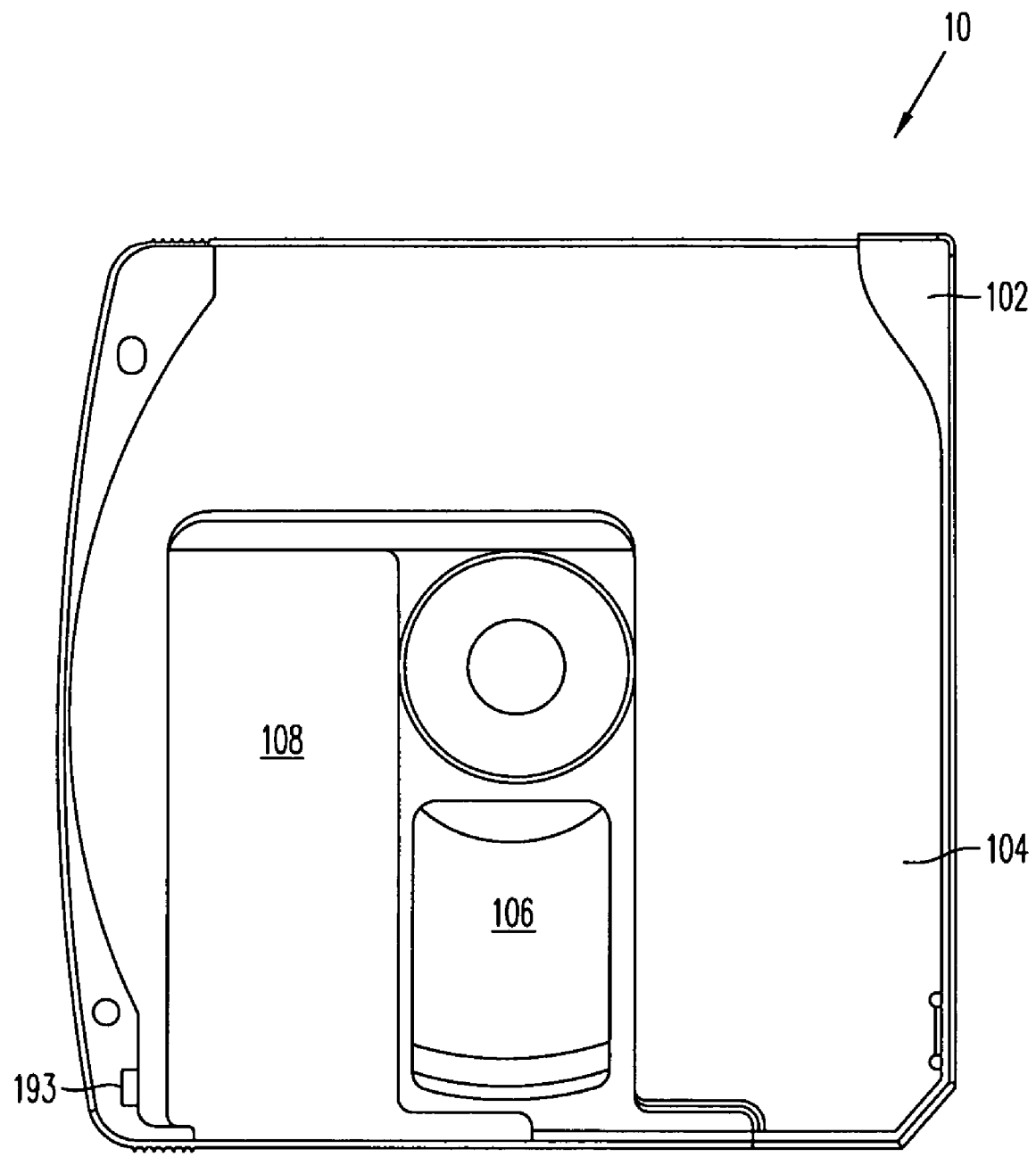
FIGS. 2A and 2B are plan views of the top and bottom, respectively, of the cartridge of this invention.
Figure 2B:
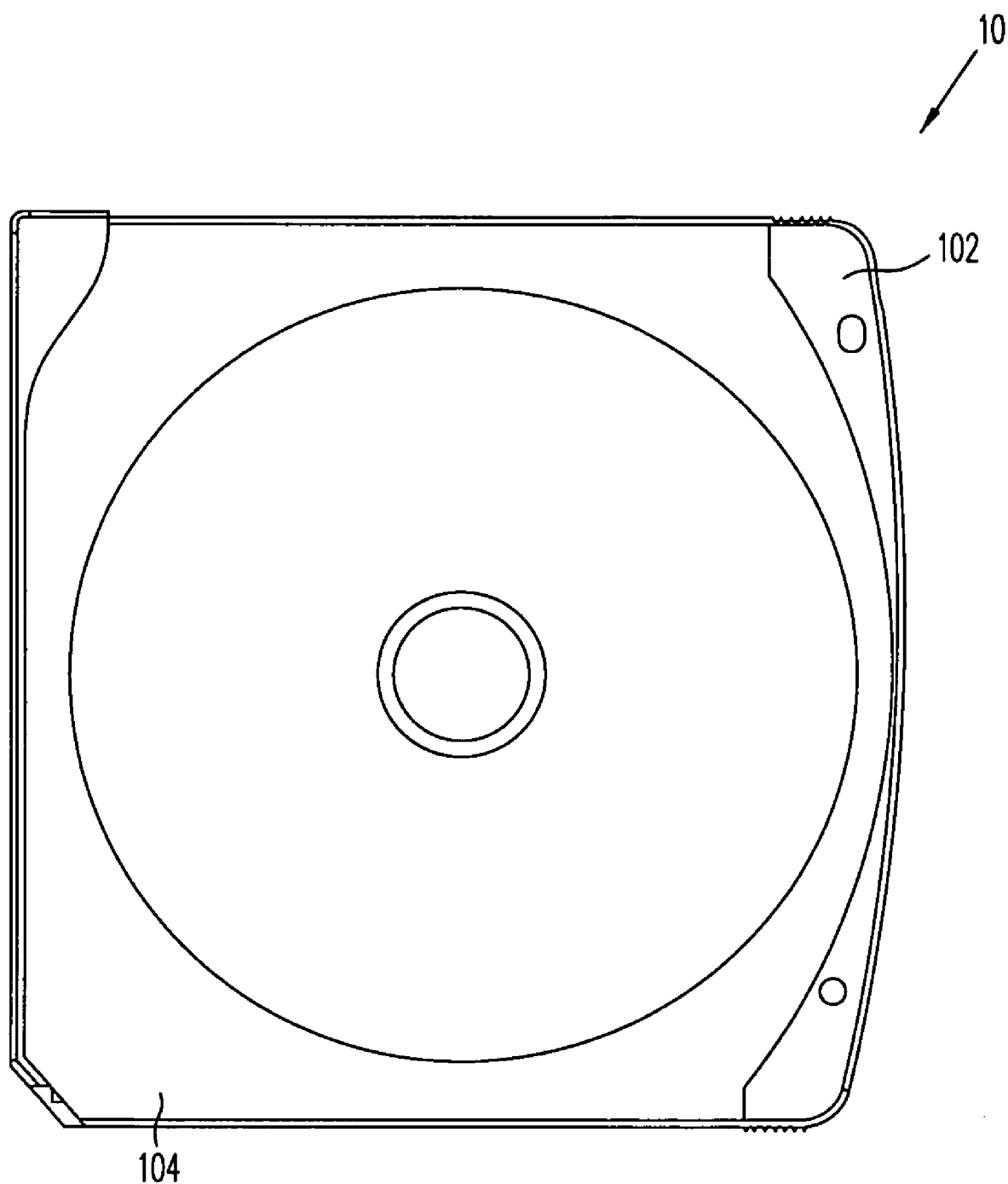

FIGS. 1A and 1B show perspective views of a cartridge 10 according to this invention. Included in both views are an insert 102, which is preferably made of plastic, and a sheath 104, which is made of sheet metal, preferably stainless steel. Insert 102 will be referred to as a "plastic insert" herein, although it will be understood that insert 102 could be made of other materials, such as metals, ceramics, linen phenolic, wood, composite materials, compressed paper or other fibers. FIG. 1A shows the top side of cartridge 10, and FIG. 1B shows the bottom side of cartridge 10. FIGS. 2A and 2B are top and bottom plan views of cartridge 10, respectively. Also visible in these views are a shutter opening 106, a shutter 108, and a spindle opening 110. As shown in FIG. 2A, a recess 193 is formed in cartridge 10. Recess 193 interacts with a mechanism on the drive to retain cartridge 10 in the drive after it has been inserted into the drive. Recess 193 is also shown in FIGS. 10A and 10B.

Figure 3:
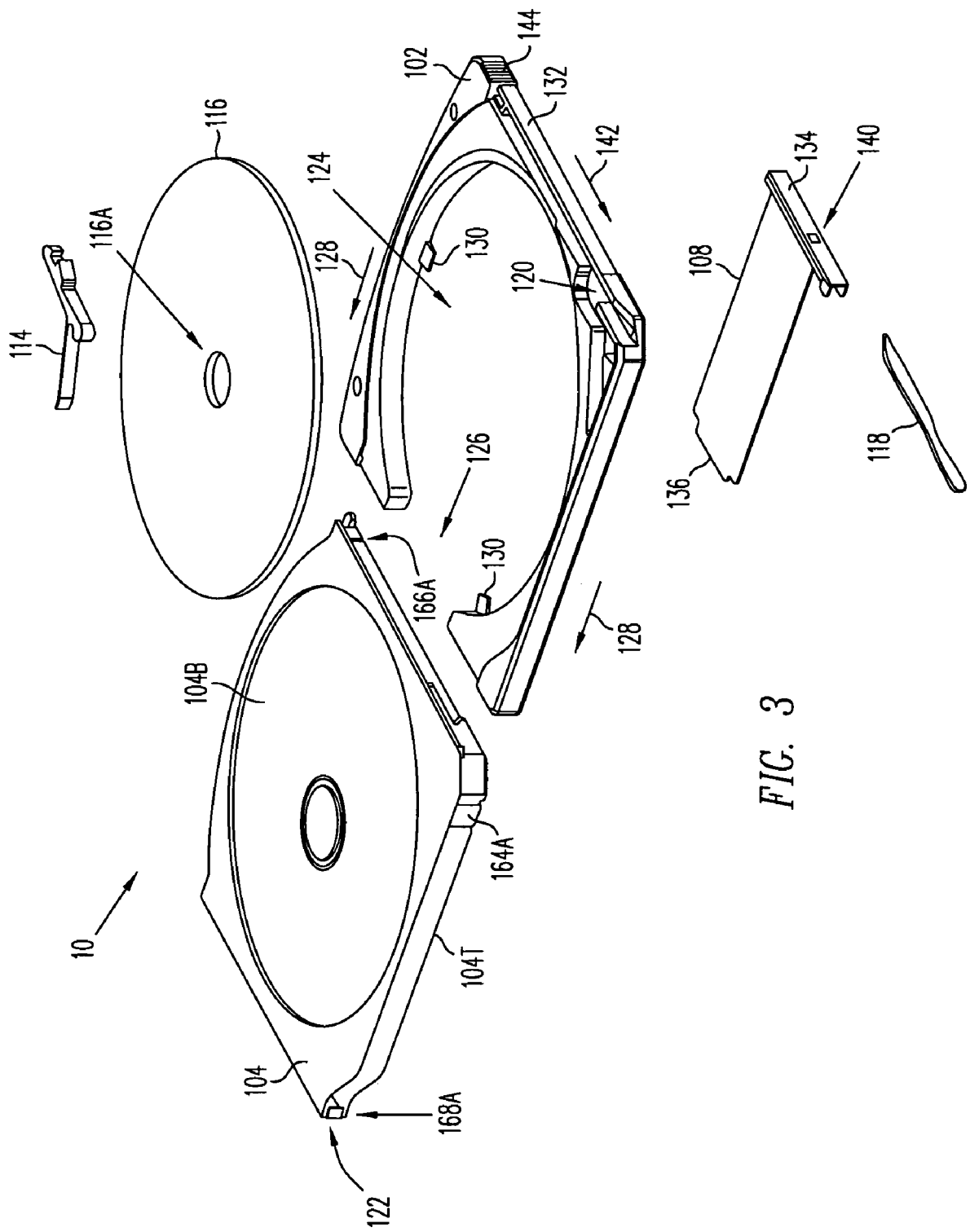
FIG. 3 is an exploded view of the cartridge.

FIG. 3 shows an exploded view of cartridge 10, viewed from the bottom side. As shown, sheet metal sheath 104 is preferably made from a single piece of sheet metal that is folded back on itself in a bend area 122, forming a bottom wall portion 104B and a top wall portion 104T on the opposite sides of bend area 122. Plastic insert 102 is inserted into sheath 104 in the direction indicated by the arrows 128. Plastic insert 102 includes an opening 124 wherein an optical data storage disc 116 is enclosed, and one edge of plastic insert 102 has a gap 126 that leads to opening 124. When cartridge 10 is fully assembled, gap 126 of plastic insert 102 is adjacent the bend area 122 of sheath 104. Three tabs 130 (of which only two are visible) project radially inward from the edge of opening 124, which is in the shape of a circular arc. Disc 116 rests on tabs 130 during the assembly of cartridge 10, before plastic insert 102 has been inserted into sheath 104. In another embodiment, the metal sheath includes wall portions that are separate from each other.

Shutter 108 fits adjacent to top wall portion 104T and moves between an open position, wherein shutter opening 106 is exposed, and a closed position, wherein shutter opening 106 is closed. Shutter 108 slides in a recessed area 105 of wall portion 104T, shown in FIG. 1A, that is formed by stamping the sheet metal. The inside surface of shutter 108 may be coated with PTFE or another coating to reduce friction and wear. In moving between the open and closed positions, shutter 108 slides on a rail 132 that is formed in plastic insert 102. A sliding portion 134 of shutter 108 slides on rail 132. A tab 136 at a cantilevered end of shutter 108 slides under a metal strip 118, preferably stainless steel, which is welded to the face of top wall portion 104T.

Shutter 108 is locked in the closed position by a latch 114, which fits into a latch recess 120 formed in plastic insert 102. A rectangular window 140 in shutter 108 is designed to engage a feature of an external disc drive to pull shutter 108 from the closed position to the open position when cartridge 10 is inserted into the disc drive. In this embodiment, cartridge 10 is inserted into a disc drive in the direction of arrow 142, and a pair of knurled areas 144 are provided on plastic insert 102 to assist the user in manually gripping cartridge 10. The second knurled area 144, located near the upper corner of plastic insert 102, is not visible in FIG. 3.

Figure 4A:
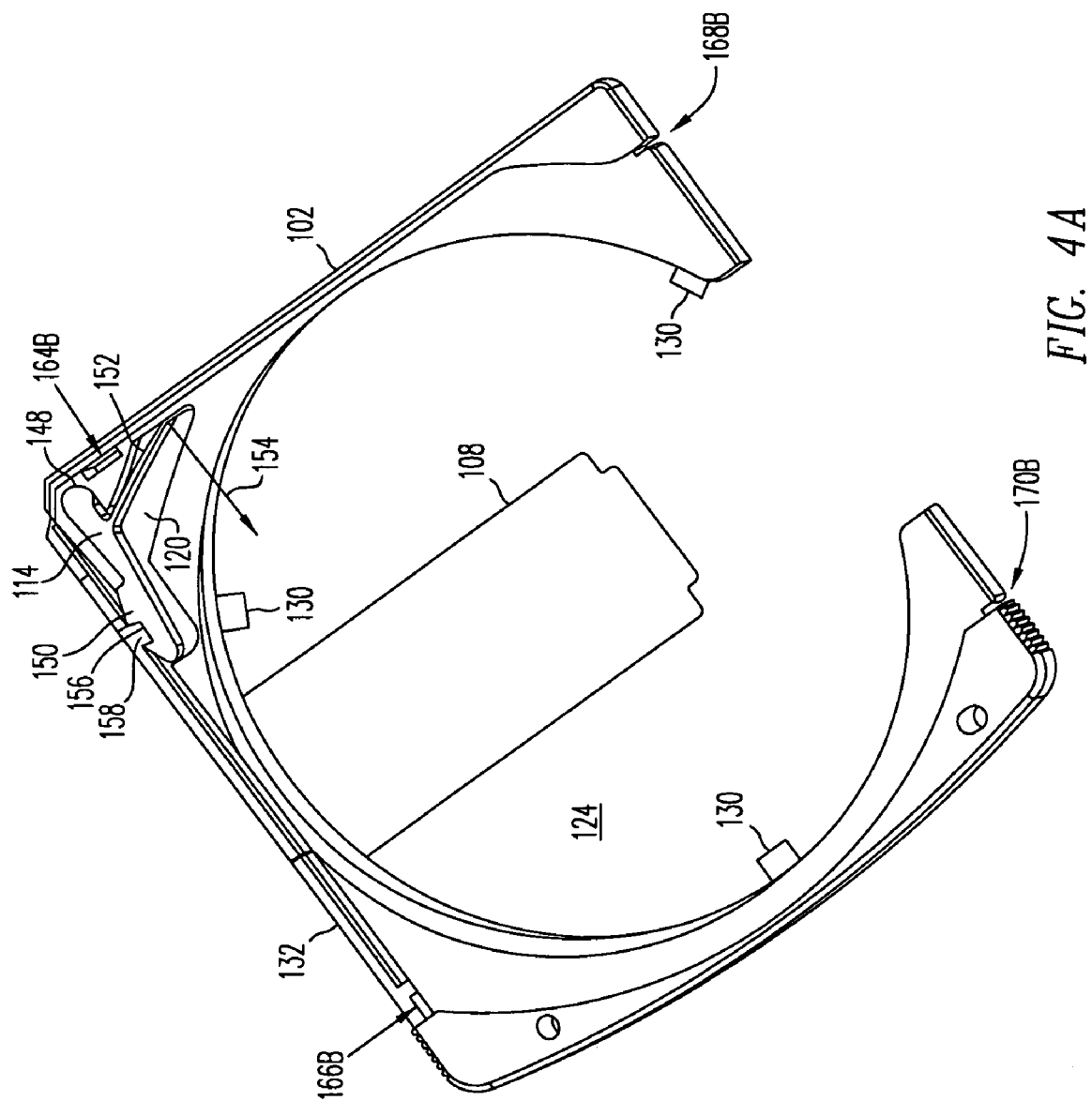
FIGS. 4A and 4B are views of the plastic insert and shutter showing the shutter in the closed and open positions, respectively.
Figure 4B:
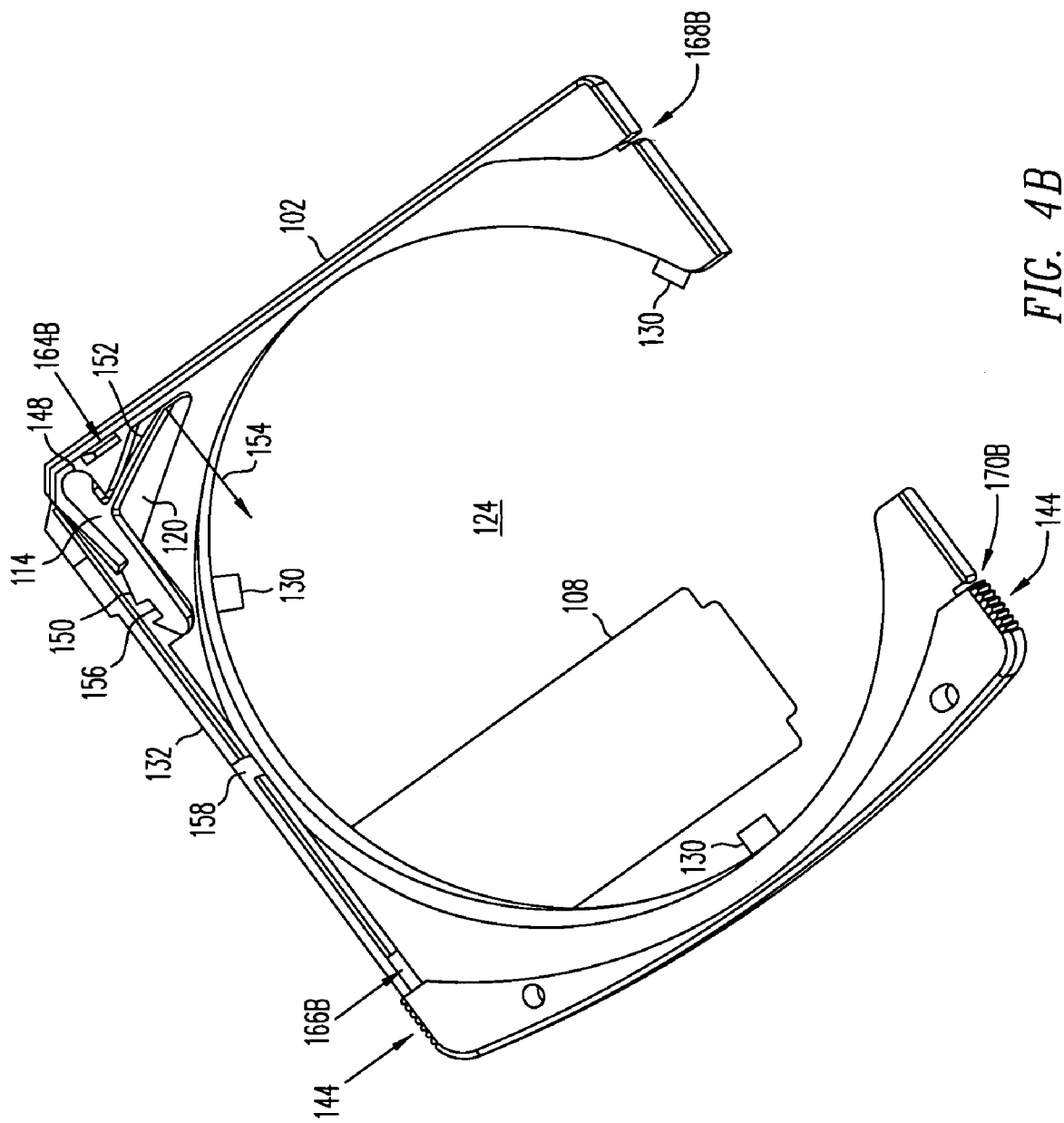

FIGS. 4A and 4B show plastic insert 102 and shutter 108, with shutter 108 in the open and closed positions, respectively. FIGS. 5 and 6 are detailed views of latch 114 and shutter 108, respectively. As shown in FIGS. 4A and 4B, latch 114 rests in latch recess 120. Latch 114 is preferably made of molded plastic, preferably nylon. As shown in FIGS. 4A, 4B and 5, latch 114 has a cylindrical surface 148 which contacts a corresponding cylindrical wall of recess 120, thereby allowing a main body 150 of latch 114 to rotate within recess 120 about a vertical axis defined by cylindrical surface 148. Latch 114 also contains a spring arm 152, which is made thin enough to flex and which is angled with respect to the main body 150 such that spring arm 152 flexes slightly in the direction of arrow 154 when latch 114 is placed in recess 120, thereby maintaining latch 114 in the extended position shown in FIGS. 4A and 4B. With this structure, there is no need to connect latch 114 to plastic insert 102 and/or sheath 104 by means of a rotary shaft or pin. This is a significant feature when the parts must be very small.

Latch 114 also contains a notch 156 which mates with a tab 158 of shutter 108 when shutter 108 is in the closed position. When shutter 108 is closed, the spring force provided by spring arm 152 rotates main body 150 of latch 114 such that tab 158 remains in engagement with notch 156. When shutter 108 is to be opened, typically by inserting cartridge 10 into a disc drive, an external feature of the disc drive (not shown) slides against a ramp 160, thereby opposing the force of spring arm 152 and forcing main body 150 to rotate in such a way the notch 156 retracts into plastic insert 102 and is disengaged from tab 158. When notch 156 and tab 158 have been separated, an external feature (not shown) engages window 140, moving shutter 108 from the closed position to the open position. When cartridge 10 is removed from the disc drive, the external feature slides shutter 108 from the open position to the closed position, and tab 158 slides on a ramp 162 (see FIG. 5), again retracting latch 114 until tab 158 clears the ramp 162 and again rests in notch 156.

Figure 8:
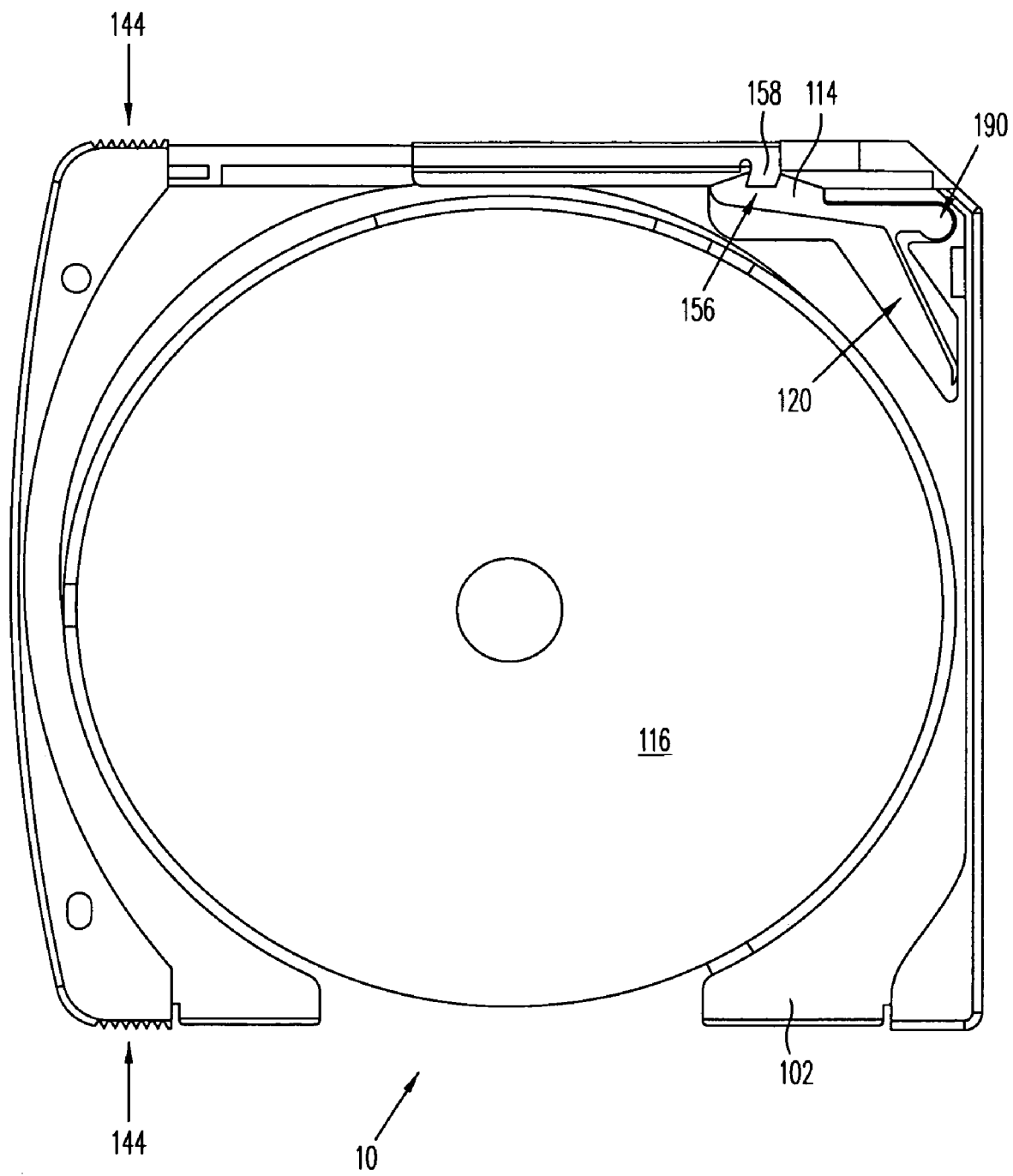
FIG. 8 is a top view of the plastic insert showing the disc and the latch.

FIG. 8 is a top view of cartridge 10 with the sheet metal sheath 104 removed, showing the position of latch 114 in recess 120 as well as the location of the axis of rotation 190 of latch 114. Also shown in FIG. 8 is the engagement of notch 156 and tab 158.

It will be understood that there are numerous other ways of providing a shutter locking function. This invention is not limited to the example described above, but rather may employ a wide variety of alternative techniques for controlling the shutter.

Referring again to FIG. 3, sheet metal sheath 104 contains metal tabs 164A and 166A, which project from top wall portion 104T. When sheath 104 is in a relaxed condition, the ends of tabs 164A and 166A abut bottom wall portion 104B. Referring to FIG. 4A, slots 164B and 166B are formed in plastic insert 102, with the dimensions of tab 164A being approximately the same as the dimensions of slot 164B, and the dimensions of tab 166A being approximately the same as the dimensions of slot 166B. In short, tabs 164A and 166A fit snuggly into slots 164B and 166B, respectively.

Prior to the assembly of plastic insert 102 and sheet metal sheath 104, disc 116 is placed in opening 124, resting on tabs 130. The wall portions 104T and 104B are then separated slightly, and plastic insert 102 is inserted into sheath 104, until tab 164A is in slot 164B and tab 166A is in slot 166B. Since sheath 104 is preferably made of a resilient material such as stainless steel, wall portions 104T and 104B can flex sufficiently to allow this to take place and then return to their original shape. At this point, the ends of tabs 164A and 166A are spot-welded to wall portion 104B. This produces a very rigid structure.

To increase the strength of cartridge 10, sheath 104 also contains tabs 168A and 170A, which extend laterally from bend area 122. Tab 168A is shown in FIG. 3, and it will be understood that tab 170A extends in a similar manner at the opposite end of bend area 122. Referring to FIG. 4A, plastic insert has niches 168B and 170B formed on the opposite sides of gap 126. As plastic insert 102 is inserted into sheath 104, as described above, tab 168A fits into niche 168B, and tab 170A fits into niche 170B. This arrangement provides additional structural stability in the vicinity of gap 126.

Figure 7A:
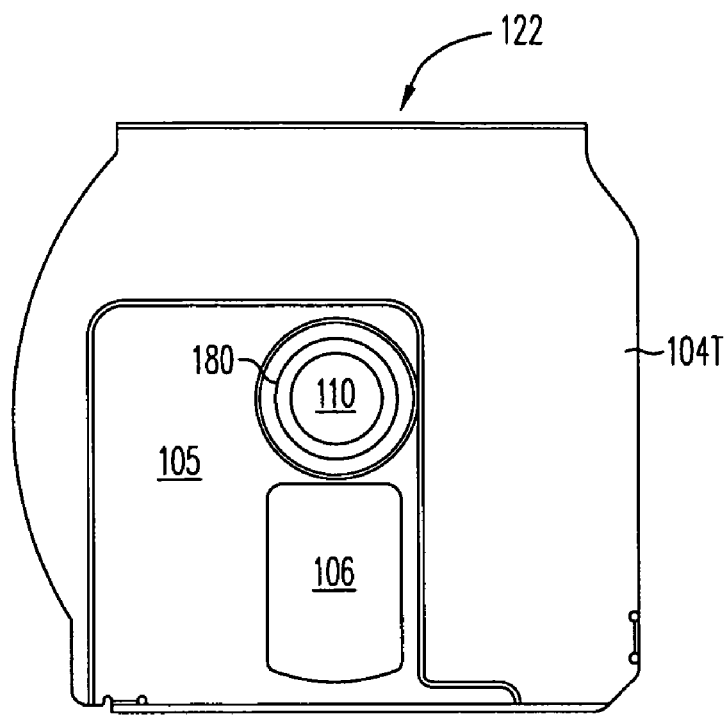
FIGS. 7A and 7B are plan views of top and bottom, respectively, of the metal sheath.
Figure 7B:
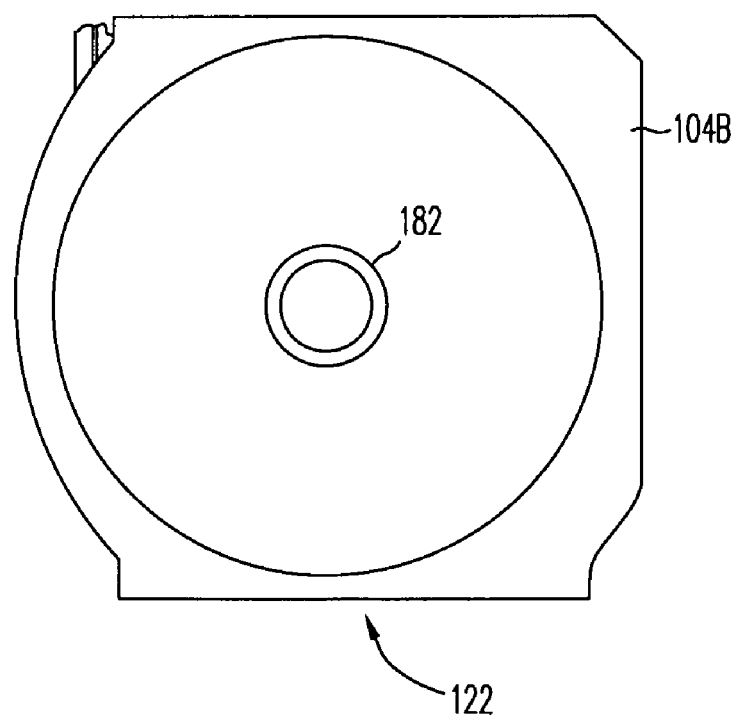
Figure 9:
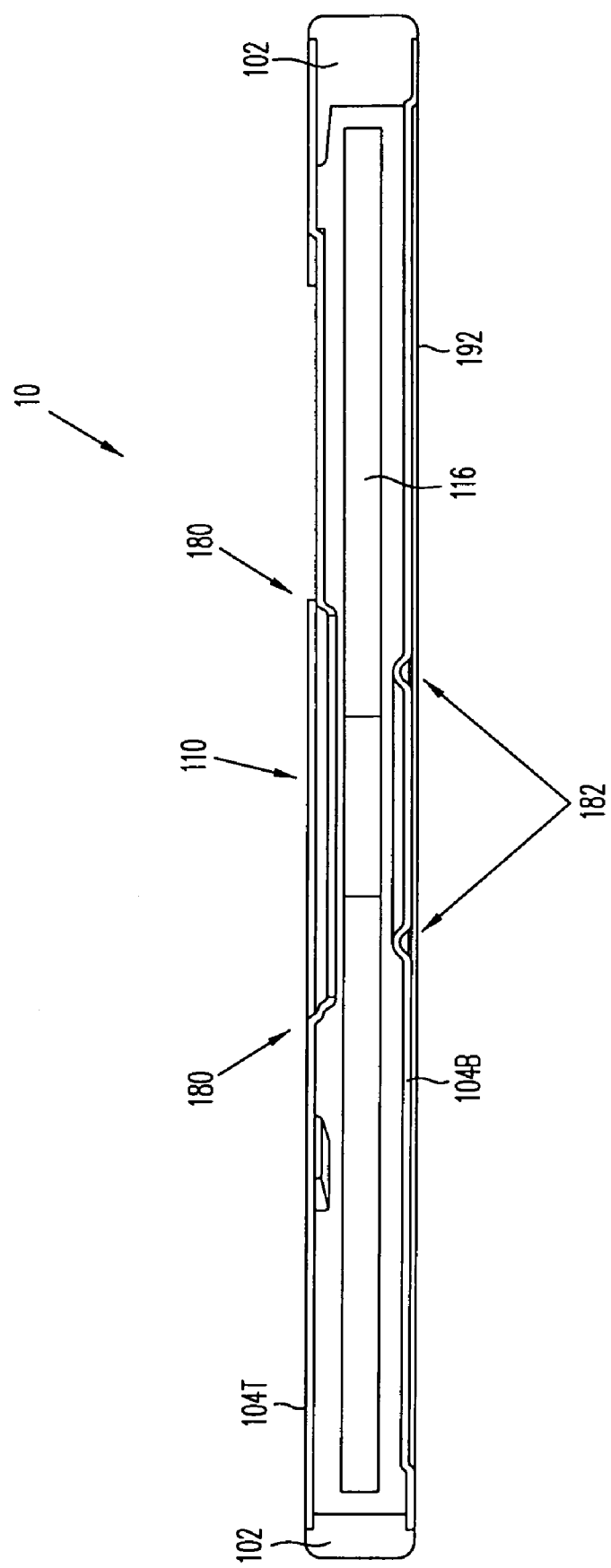
FIG. 9 is a cross-sectional view of the cartridge taken at section 9-9 shown in FIG. 1B.

Disc 116 is designed to operate with a spindle hub having a barbed, snap-fit retainer similar to those employed in ordinary CD drives. Thus, as shown in FIG. 3, disc 116 has a central hole 116A but does not have a hub. When cartridge 10 has been fully assembled, disc 116 is supported by raised rings 180 and 182, shown in FIGS. 7A and 7B, that are formed on the inside surfaces of wall portions 104T and 104B, respectively. Raised rings 180 and 182 are embossed in the sheet metal. In one embodiment raised rings 180 and 182 are 0.35 mm high. FIG. 9 is a cross-sectional view of cartridge 10 showing the locations of raised rings 180 and 182. As indicated, raised ring 180 is located at the circumference of spindle opening 110. Also shown in FIG. 9 is a paper label 192 that fits in a stamped recess in the bottom wall portion of 104B of sheet metal sheath 104. This is sometimes referred to as the "label side" of cartridge 10.

In one embodiment, cartridge 10 is designed to fit into a disc drive that fits into a CompactFlash® slot in a PDA, for example. The thickness of such a cartridge could be targeted at 2.0 mm. Disc 116 could be 32 mm in diameter and 0.7 mm thick, leaving about 1.3 mm for remainder of the cartridge. Top wall portion 104T and shutter 108 are on one side of disc 116, and bottom wall portion 104B is on the other side of disc 116. If sheath 104 and shutter 108 are made of a sheet of stainless steel 0.15 mm thick, the combined thicknesses of these components would account for 0.45 mm. In addition, there might be a clearance of about 0.025 mm between the shutter 108 and top wall portion 104T, and a label 0.100 mm thick might be placed on one side of the cartridge, increasing the total to 0.575 mm. This would leave 0.725 mm (1.3-0.575) for the clearance between disc 116 and the inside surfaces of wall portions 104T and 104B, or 0.3625 mm on each side of disc 116. Assuming a vertical disc runout of ±0.05 mm, a clearance of 0.3125 mm remains for the feature size and position tolerances and any runout caused by the spindle and disc-to-spindle interface.

By comparison, if the top and bottom walls of the cartridge were made of plastic, a stable structure would require a minimum thickness on the order of 0.32 mm, instead of 0.15 mm for the sheet metal (the shutter thickness would remain the same). In addition, 0.07 mm would have to be allowed for variations in the flatness of the plastic walls. Thus the 0.3125 mm clearance on each side of the disc would be reduced to 0.0725 mm (0.3125−((0.32−0.15)+0.07))). This is too small to accommodate the remaining variables such as runout caused by the spindle.

An alternative embodiment according to the invention is shown in FIGS. 11-15, which illustrate a cartridge 20.

Figure 11A:
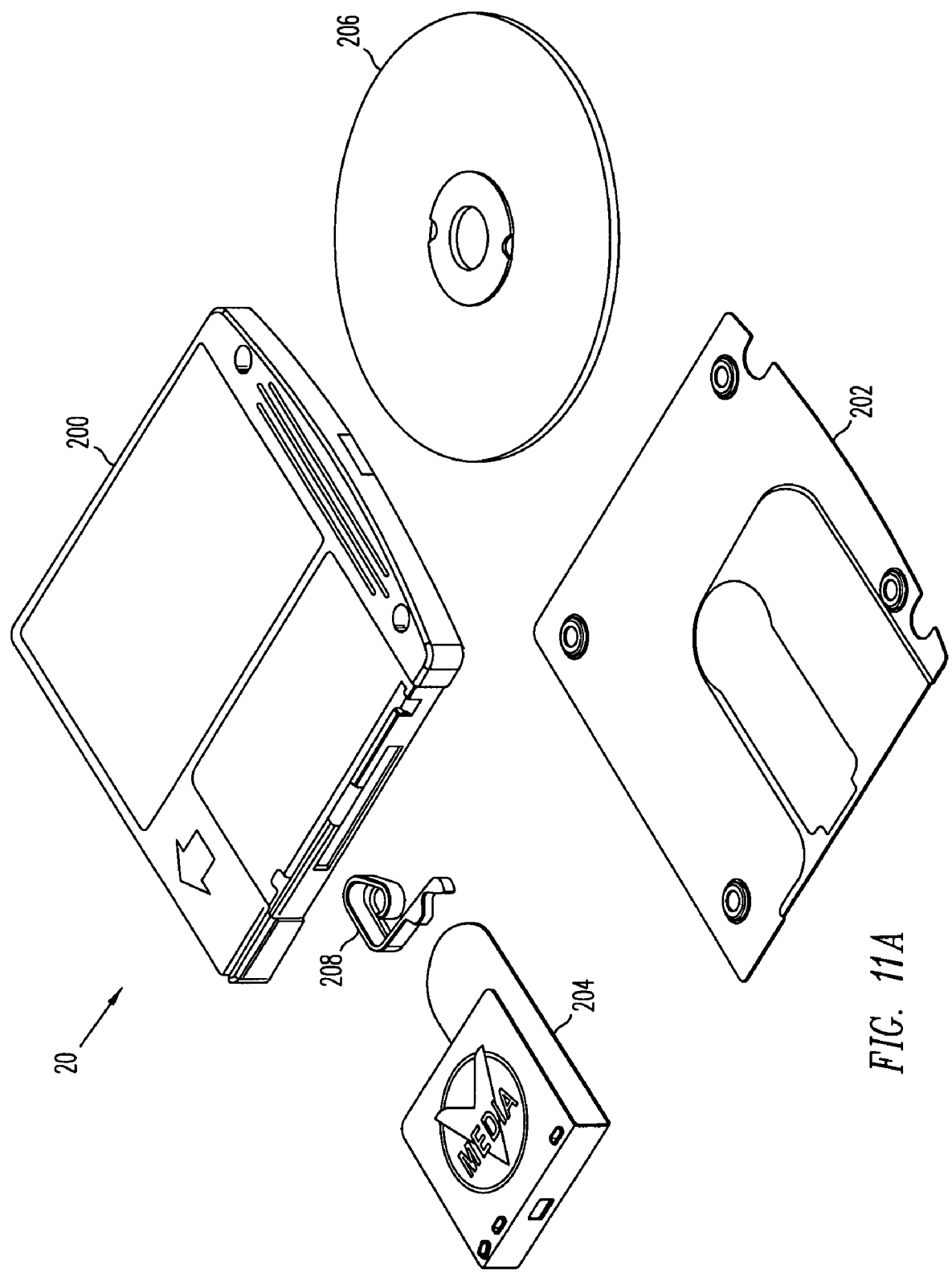
FIGS. 11A and 11B are two exploded views of a second embodiment of a cartridge according to the invention.
Figure 11B:
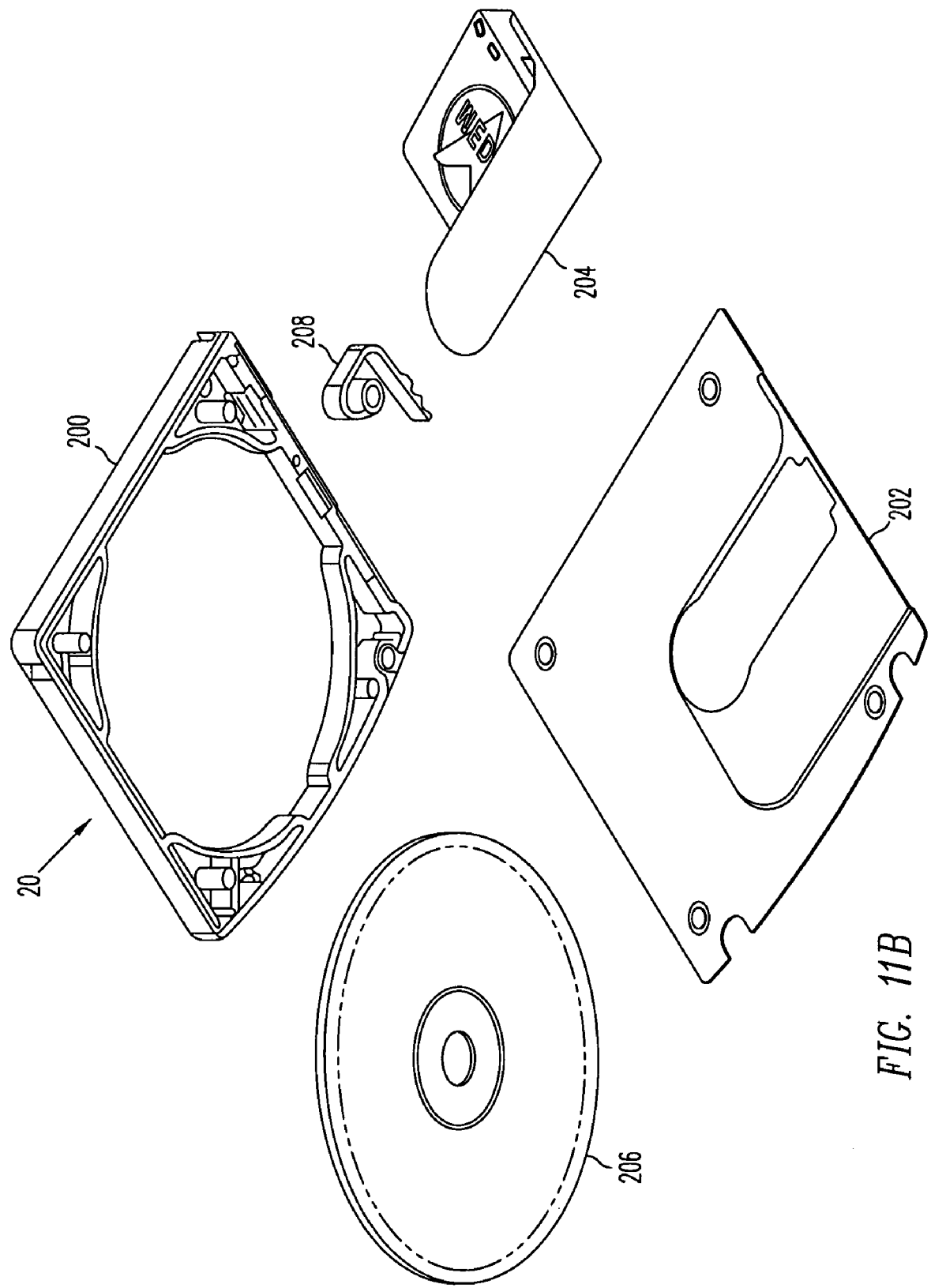

FIGS. 11A and 11B are two exploded views of cartridge 20, FIG. 11A being taken from above, FIG. 11B being taken from below. Cartridge 20 includes a shell 200, typically made of plastic, a cover plate 202, made of sheet metal, a shutter 204, an optical data storage disc assembly 206, and a latch 208.

The detailed structure and method of assembling cartridge 20 will now be described.

Figure 12A:
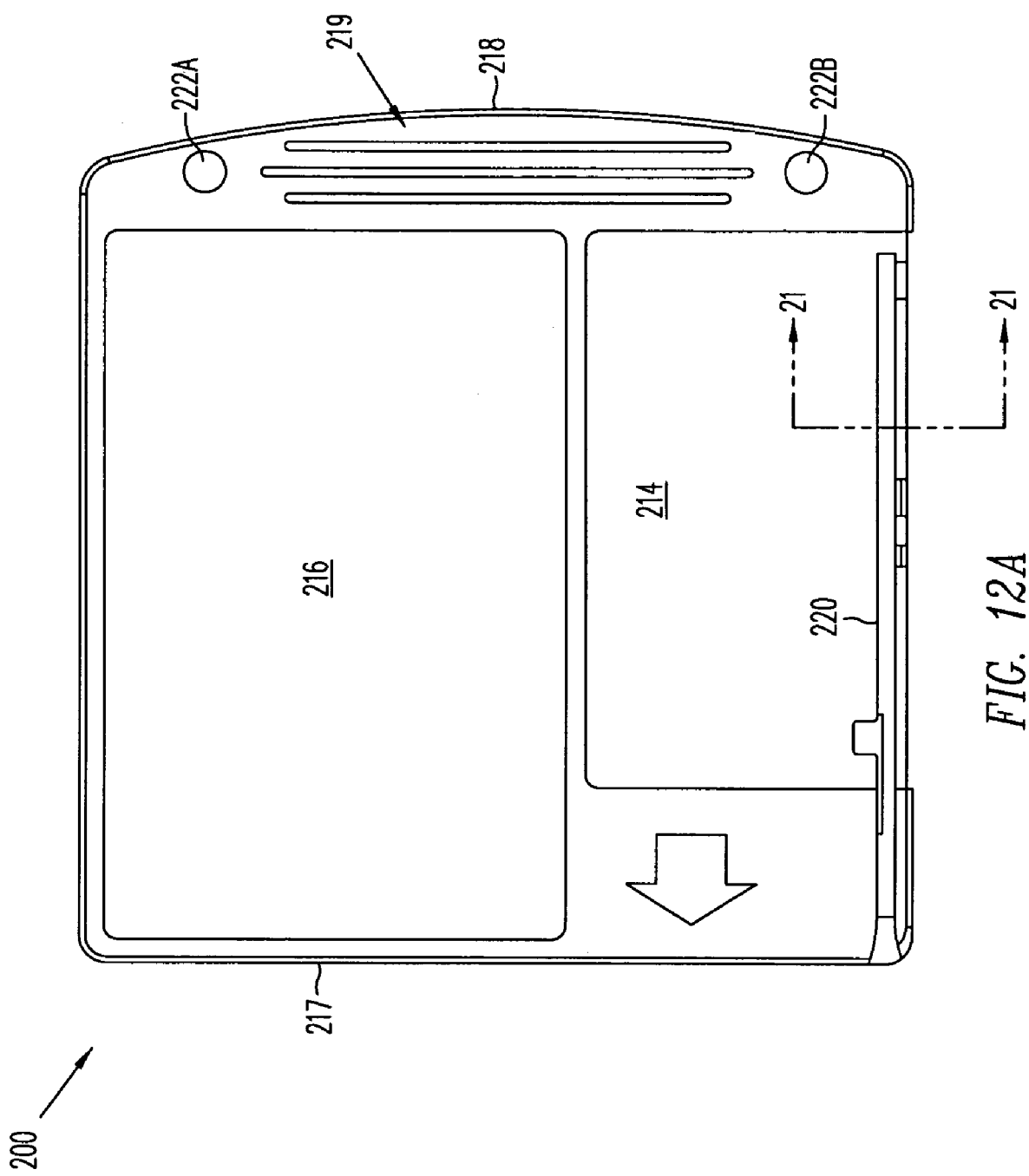
FIGS. 12A and 12B illustrate the plastic shell in the second embodiment.
Figure 12B:
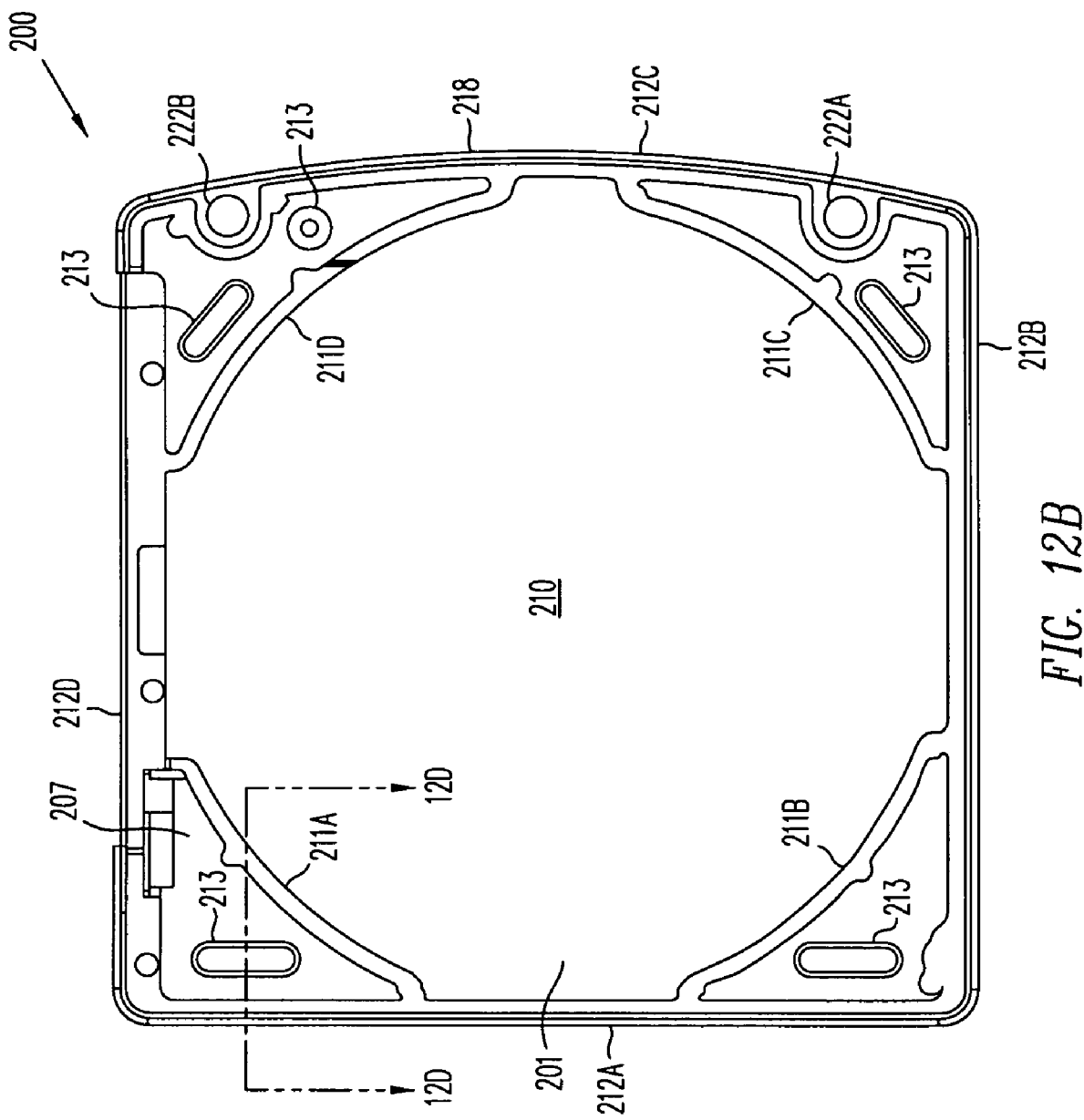

FIGS. 12A and 12B illustrate shell 200 from the outside and inside, respectively. Shell 200 may be made of lens grade polycarbonate and may be manufactured by a standard injection molding process. In one embodiment the lateral dimensions of shell 200 are approximately 36 mm×36 mm, and shell 200 is approximately 3 mm thick. Shell 200 has a leading edge 217 and a trailing edge 218 Trailing edge 218 is arc-shaped (e.g., radius≈78 mm); leading edge 217 and the side edges are generally linear.

As shown in FIG. 12A, the outside of shell 200 has shallow recesses 214 and 216, which may be recessed by 0.2 mm with respect to the surrounding portions of shell 200. As described below, a portion of shutter 204 slides in recess 214, and recess 216 can be used to hold printed material, such as a movie label. Alignment holes 222A and 222B fit over corresponding alignment posts (not shown) in the disc drive to assure that cartridge 20 is accurately positioned in the drive. Near the trailing edge 218 are three longitudinal grooves 219, approximately 0.4 mm wide and separated by 0.6 mm, to assist the user in gripping cartridge 20 when inserting it into a disc drive.

As shown in FIG. 12B, the inside of shell 200 includes a floor 201 and a plurality of lateral walls, including four inside walls 211A-211D and four perimeter walls 212A-212D. Each of perimeter walls 212A-212D runs along one side of the perimeter of shell 200. Each of inside walls 211A-211D is formed generally in the shape of a circular arc. Floor 201, inside walls 211A-211D and portions of perimeter walls 212A-212D together define a generally circular disc cavity 210, which is used to hold disc assembly 206. As explained further below, viewed from the inside of shell 200, perimeter wall 212D is thicker than perimeter walls 212A-212C. At one corner of shell 200, inside wall 211A and portions of perimeter walls 212A and 212D form a latch cavity 207, which is used to hold latch 208. Five assembly posts 213, located in latch cavity 207 and in three cavities formed by inside walls 211B-211D and perimeter walls 212A-212D, are used to attach cover plate 202 to shell 200.

As is apparent from FIGS. 12A and 12B shell 200 is preferably monolithic, i.e., shell 200 is preferably formed of a single integral piece of material. Shell 200 is preferably made of plastic but other materials such as metal could also be used to fabricate shell 200.

FIG. 12C is a detailed view of the area around leading edge 217 of shell 200. A recess 209 is formed in perimeter wall 212B. Recess 209 interacts with a pawl (not shown) in the disc drive to retain cartridge 20 in the drive when it is fully loaded.

FIG. 12D is a cross-sectional view of the assembly post 213 in latch cavity 207, taken at section line 12D-12D in FIG. 12B. As shown, assembly post 213 extends upward to a level slightly above inside wall 211A and perimeter wall 212A. As described below, this additional material in assembly posts 213 is melted to form a mushroom cap in order to attach cover plate 202 to shell 200.

Figure 13:
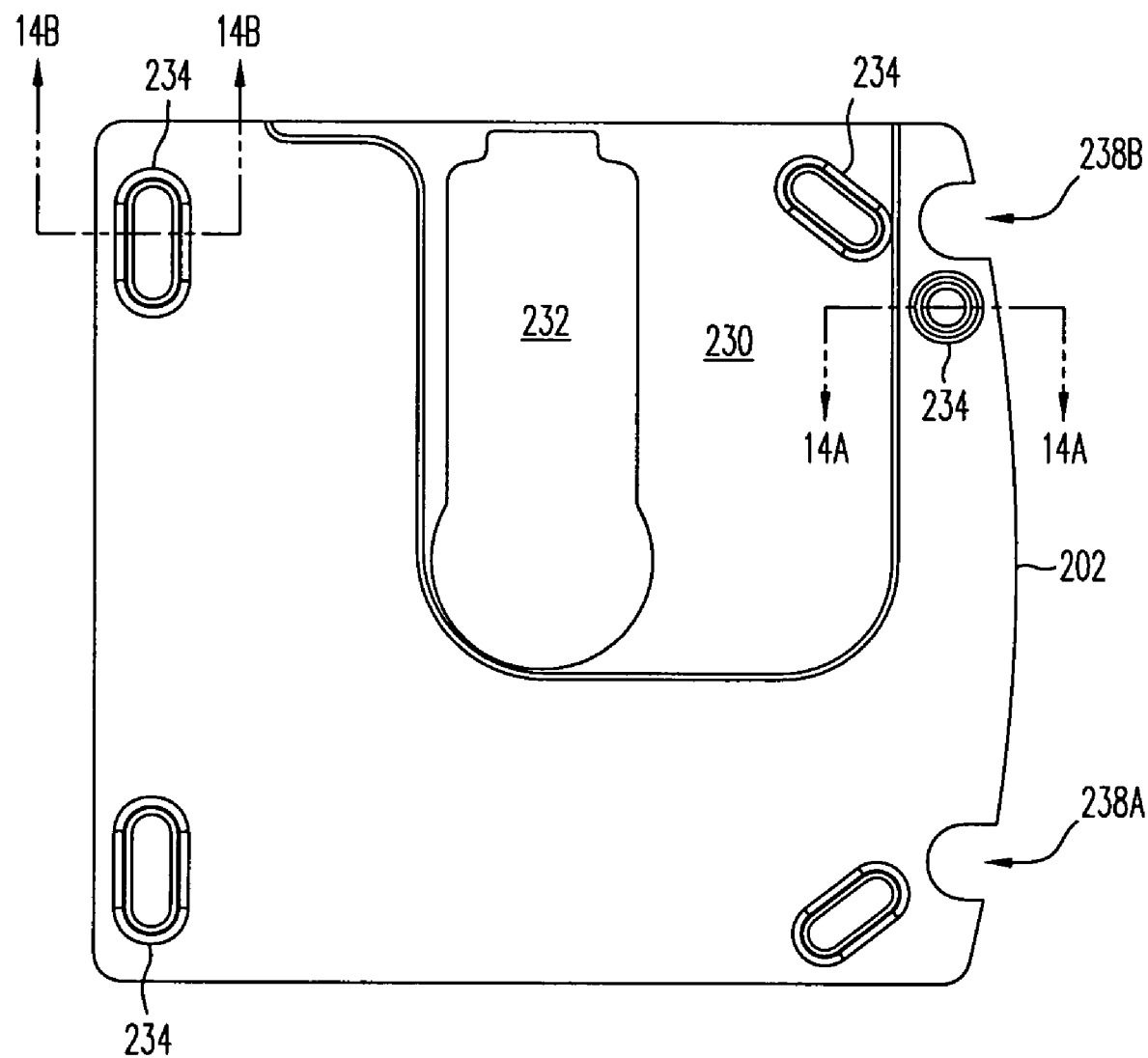
FIG. 13 shows a top view of the cover plate in the second embodiment.

FIG. 13 shows a top view of cover plate 202. Cover plate 202 can be made of a stainless steel sheet 0.15 mm thick. The stainless steel sheet is stamped to form a recess 230 and a shutter window 232 within recess 230. Recess 230 can be recessed 0.2 mm, for example, with respect to the surrounding portions of cover plate 202. As described below, a portion of shutter 204 slides back and forth in recess 230 to open and close window 232. This movement alternately protects disc assembly 206 from damage and allows data stored on disc assembly 206 to be read by an external optical pickup unit (not shown).

Figure 14A:
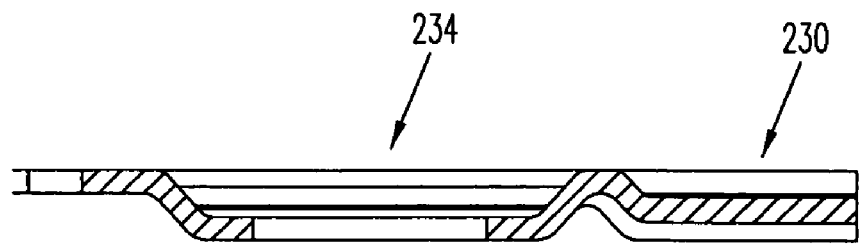
FIG. 14A is a cross-sectional view taken at section line 14A-14A in FIG. 13.
Figure 14B:
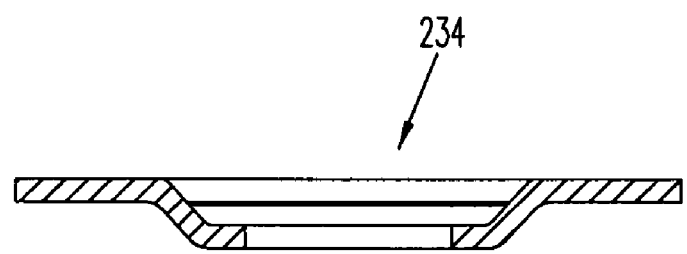
FIG. 14B is a cross-sectional view taken at section line 14B-14B in FIG. 13.

Near the corners of cover plate 202 are five recessed holes 234. FIGS. 14A and 14B are cross-sectional views of two of recessed holes 234, taken at section lines 14A-14A and 14B-14B, respectively, in FIG. 13. As shown, the edge of recessed hole 234 is recessed (e.g., by 0.15 mm) with respect to the surrounding surface of cover plate 202.

Cover plate 202 is planar except for recess 230 and the recesses around holes 234. In other embodiments, recess 230 and/or the recesses around holes 234 may be omitted.

Notches 238A and 238B in cover plate 202 are aligned with alignment holes 222A and 222B in shell 200 to accommodate the alignment posts (not shown) in the disc drive.

Figure 15A:
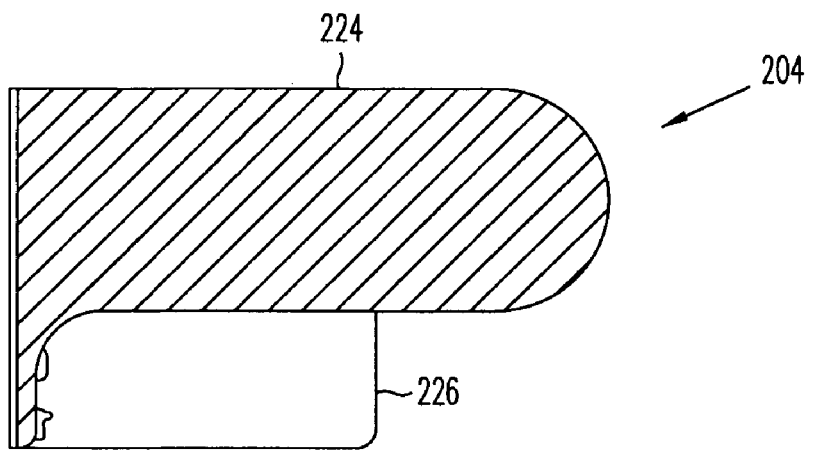
FIGS. 15A-15D illustrate the structure of the shutter in the second embodiment.
Figure 15C:
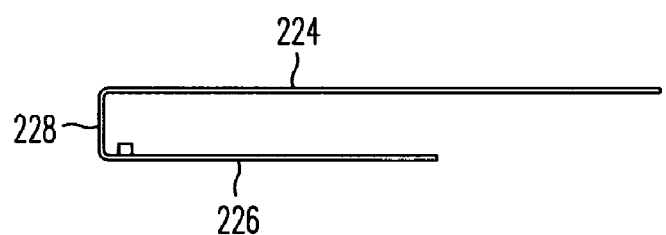
Figure 15B:
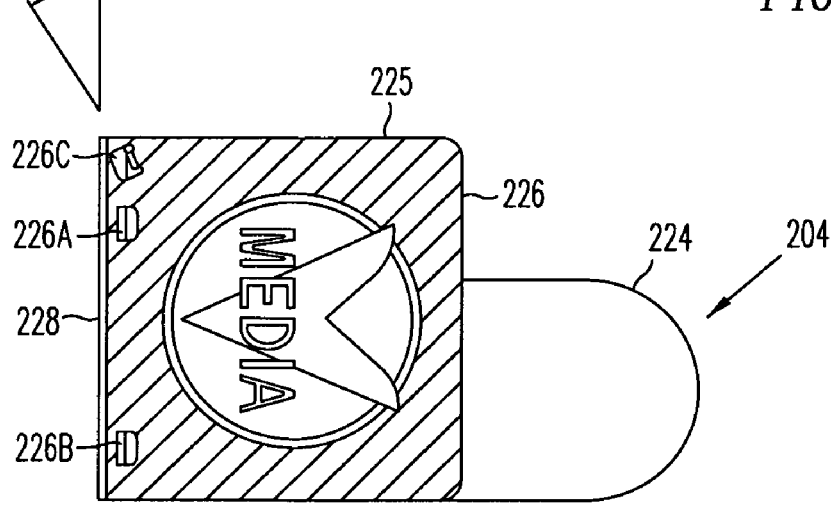
Figure 15D:
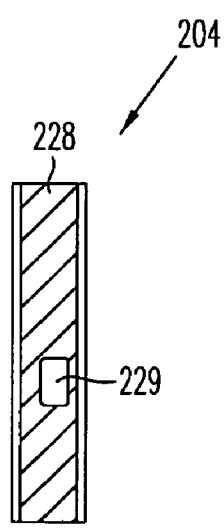

FIGS. 15A-15D illustrate the structure of shutter 204. As is evident from FIG. 15C, shutter 204 is U-shaped. Shutter 204 may be made from a sheet of stainless steel 0.13 mm thick, for example. When cartridge 20 is assembled, shutter 204 essentially wraps around one edge of cartridge 20 and slides along the edge of cartridge 20 to alternately open and close a shutter window in cover plate 202. As shown in FIG. 15C, shutter 204 includes a protective flap 224 and a clamping flap 226, which are connected together by an edge wall 228. FIG. 15A shows shutter 204 from the side of protective flap 224; FIG. 15B shows shutter 204 from the side of clamping flap 226; and FIG. 15D shows shutter 204 from the side of edge wall 228. As shown in FIG. 15B, clamping flap 226 is stamped to form tracking tabs 226A and 226B and a latch tab 226C. Tracking tabs 226A and 226B may have a width equal to 1.25 mm and latch tab 226C may have a width equal to 0.7 mm, for example. The length of tracking tabs 226A and 226B and latch tab 226C can be 0.43 mm. Latch tab 226C is slanted at an angle α of about 20° in relation to edge wall 228.

As shown in FIG. 15D, an opening 229 is formed in edge wall 228. Opening 229 engages a feature in the disc drive to assist in opening and closing shutter 204 as cartridge 20 is inserted into and withdrawn from the disc drive.

FIG. 16 shows a cross-sectional view of disc assembly 206, which includes an optical disc 240 and an annular magnetic retainer ring 242. FIGS. 17A and 17B are top views of disc 240 from its data side and the non-data side, respectively.

Referring to FIG. 16, the non-data side of optical disc 240 is shown facing upward and the data side of optical disc 240 is shown facing downward. Optical disc 240 may be 32 mm in diameter and 0.55 mm thick and has a center hole 244 which may be 4.010-4.022 mm in diameter. Magnetic retainer ring 242 is glued to the non-data side of optical disc 240 concentric with center hole 244.

Referring to FIG. 17A, data area 250 of optical disc 240 is shown. The inner circumference of data area 250 may have a radius of 6.88 mm and the outer circumference of data area 250 may have a radius of 14.8 mm. A bar code area/inner radius graphics (BCA/IRG) area 256 extends from a radius of 5 mm to a radius of 5.8 mm.

FIG. 18A is a cross-sectional view of optical disc 240 in the area around center hole 244. On the non-data (top) side, a shallow recess 245, which may be 0.05 mm deep, is formed in the area where magnetic retainer ring 242 will be attached to optical disc 240 by gluing. A circular moat 246, which may be 0.2 mm deep and 1 mm wide, is formed to catch any glue that may flow inward and thereby prevent the glue from entering center hole 244. Moat 246 may be 6 mm in diameter.

On the data (bottom) side of optical disc 240, a circular raised rim 248 is formed concentric with center hole 244, to prevent data area 250 of optical disc 240 from coming into contact with cover plate 202 when disc assembly 206 is enclosed in disc cavity 210. Rim 248 may be 0.25 high, 1 mm wide and 9 mm in diameter. Raised rim 248 is also useful in the disc cover layer manufacturing process, since it prevents the liquid lacquer used in the cover layer spin coating process from flowing into center hole 244. When disc assembly 206 is in a static position, with its non-data side resting on floor 201 of disc cavity 210, the clearance between raised rim 248 and the inside surface of cover plate 202 is about 0.35 mm.

Just outside of rim 248 is a stamper holder feature 252. Recess 245, moat 246, rim 248 and stamper holder feature 252 are formed when optical disc 240 is molded. Optical disc 240 is preferably made of polycarbonate and is formed by a known injection molding process. The standard molding process used in the manufacture of DVD discs may be used to manufacture optical disc 240.

The thickness of cartridge 20 could be targeted at 2.8 mm. Optical disc 240 could be 32 mm in diameter and have a maximum thickness (including magnetic retainer ring 242) of 0.9 mm, leaving about 1.9 mm for the remainder of cartridge 20.

FIG. 18B is a cross-sectional view near the edge of optical disc 240. As shown, the edge of optical disc 240 is formed with a draft angle d of 5-7 degrees to allow the disc to be ejected from the mold without deforming the molded disc.

Figure 19B:
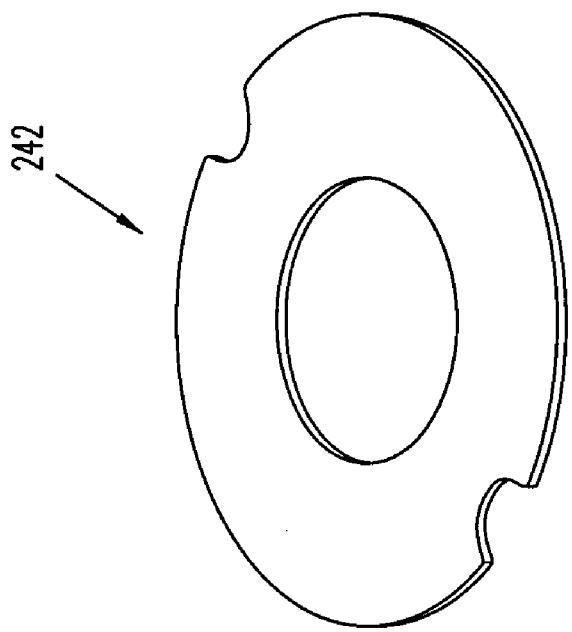
FIG. 19B is a perspective view of the magnetic retainer ring.
Figure 19A:
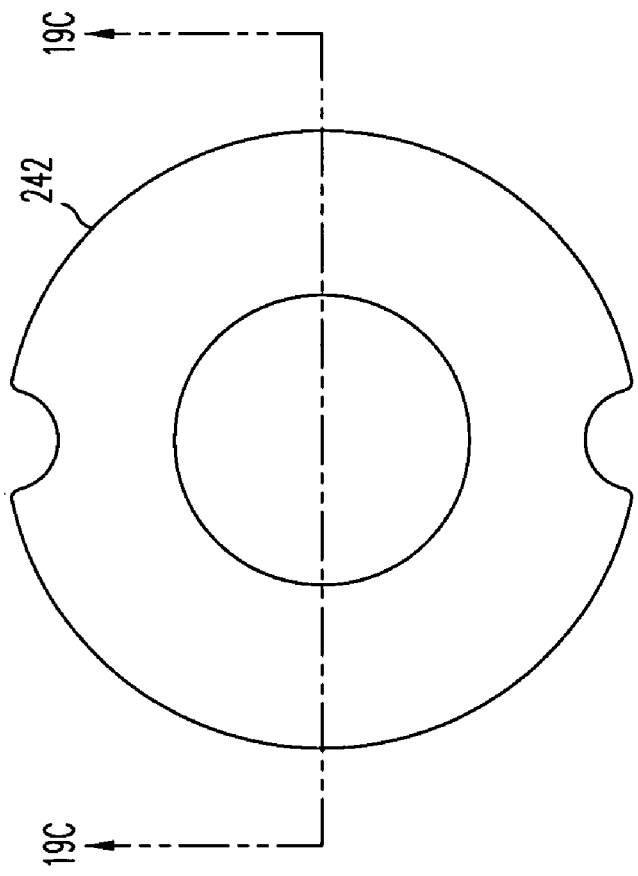
FIG. 19A is a top view of the magnetic retainer ring.
Figure 19C:
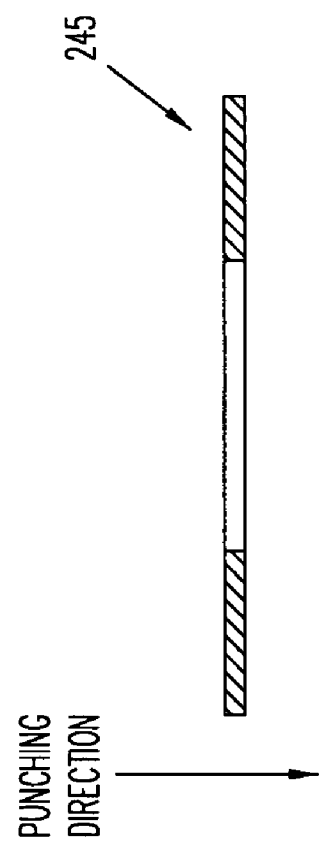
FIG. 19C is a cross-sectional view along a diameter of the magnetic retainer ring.

FIGS. 19A, 19B and 19C are views of magnetic retainer ring 242. The center hole of magnetic retainer ring 242 may have a diameter of 4.5 mm and the outer circumference of magnetic retainer ring 242 may have a diameter of 9.2 mm. Magnetic retainer ring 242 may be formed of a 0.2 mm thick sheet of stainless steel 430 or another magnetic metal.

Magnetic retainer ring 242 may be attached to optical disc 240 by supporting magnetic retainer ring 242 on a mounting post and placing adhesive dots of an ultraviolet (UV) curable adhesive such as Dymax 3013-T onto magnetic retainer ring 242. Optical disc 240 is placed on magnetic retainer ring 242 with the data side facing upward and with magnetic retainer ring 242 fitted into recess 245. A vertical top load (e.g., 5-7 oz) is placed on optical disc 240 and UV light is directed through the vertical top load and center hole 244 to cure the adhesive. The vertical top load is annular with a 5-8 mm through hole to allow a UV light guide to be used.

FIGS. 20A and 20C are top and bottom views, respectively, of latch 208. FIG. 20B is a side view of latch 208. Latch 208 can be made of a flexible plastic such as polypropylene. Latch 208 includes arm segments 256, 258 and 260, each of which can be formed of a strip that is 1.5 mm wide and 0.5 mm thick. Arm segment 258 may be 3.4 mm long and arm segment 260 may be 7.2 mm long. The angle a between arm segments 256 and 258 may be 36°; the angle b between arm segments 258 and 260 may be 105°. An arc segment 261 is located at an end of arm segment 256.

A hook 262 and a release cam 264 extend from one side of arm segment 260. Hook 262 has a cam surface 265 on one side and a gripping surface 267 on the opposite side. Cam surface 265 can be angled at 105° with respect to the longitudinal direction of arm segment 260, and gripping surface 267 is close to perpendicular to the longitudinal direction of arm segment 260. Release cam 264 has a leading edge 266 and a trailing edge 268. Leading edge 266 is angled at about 75° with respect to the longitudinal direction of arm segment 260. A notch 263 is formed between hook 262 and release cam 264. As can be seen from FIG. 20B, hook 262 and release cam 264 are not as thick as arm segments 256, 258 and 260.

Figure 20D:
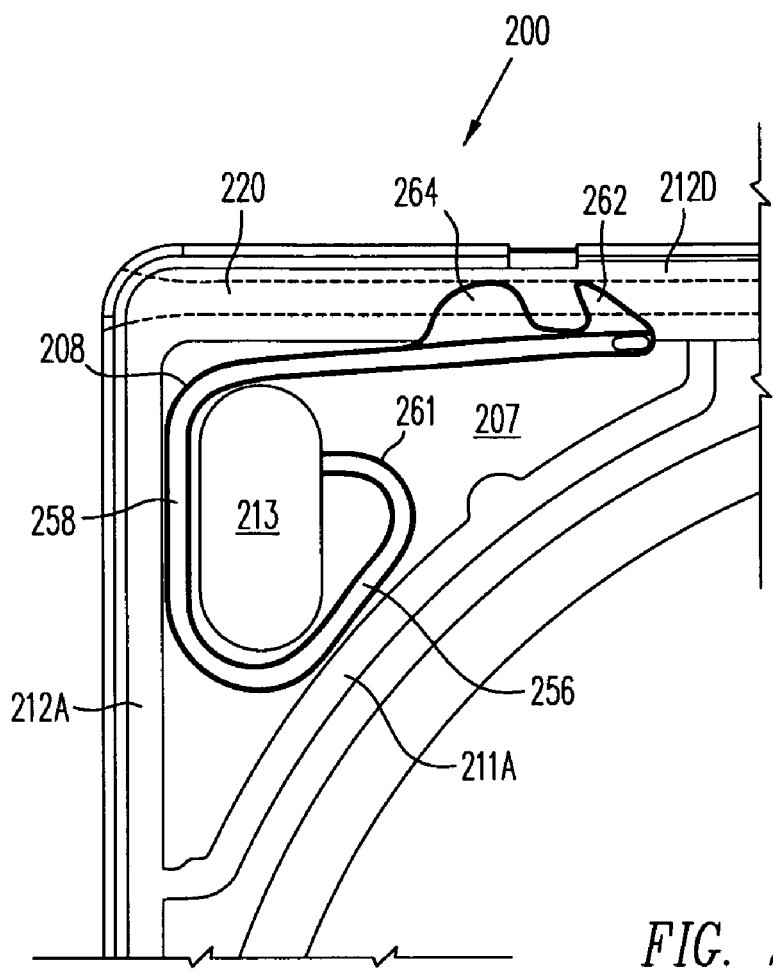
FIG. 20D shows the latch positioned in the latch cavity.
Figure 20E:
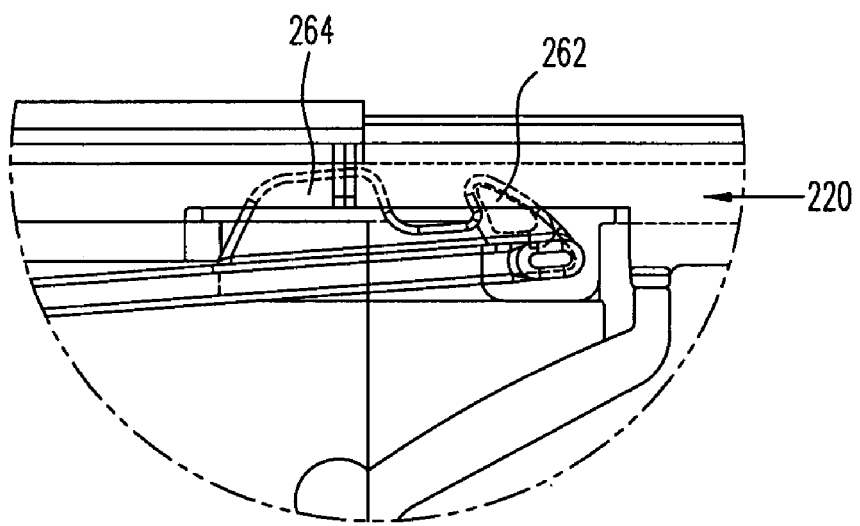
FIG. 20E shows the hook and release cam projecting into the shutter tracking groove.

FIG. 20D shows how latch 208 is positioned in latch cavity 207 (see also FIG. 12B). Arc segment 261 and arm segments 256 and 258 enclose one of assembly posts 213 and arm segment 258 rests against perimeter wall 212A. Hook 262 and release cam 264 extend through a window in perimeter wall 212D into a shutter tracking groove 220, which is formed in perimeter wall 212D on the opposite side of shell 200. As assembled in latch cavity 207, latch 208 is in a flexed condition. FIG. 20E is a more detailed view of hook 262 and release cam 264 projecting into shutter tracking groove 220.

Cartridge 20 is assembled by placing latch 208 into cavity 207, placing disc assembly 206 into disc cavity 210, attaching cover plate 202 to shell 200 using assembly posts 213, and affixing shutter 204 on the outside of cartridge 200. The use of a monolithic shell and a cover plate which is attached to one side of the shell greatly simplifies the fabrication of the cartridge. These steps will now be described in greater detail.

Initially latch 208 is placed into latch cavity 207 in the manner shown in FIG. 20D, with arc segment 261 and arm segments 256 and 258 around the assembly post 213 that is located in latch cavity 207. Arm segment 256 abuts inside wall 211A, arm segment 258 abuts perimeter wall 212A, and arm segment 260 abuts perimeter wall 212D. The operation of latch 208 is described below.

Next, disc assembly 206 is placed in disc cavity 210, with the data side facing upward. Retainer ring 242 rests on the floor 201 of disc cavity 210. The clearance between the outside edge of optical disc 240 and inside walls 211A-211D can be 1.05 mm.

With latch 208 in latch cavity 207 and disc assembly 206 in disc cavity 210, cover plate 202 is placed on top surfaces of inside walls 211A-211D and perimeter walls 212A-212D, closing latch cavity 207 and disc cavity 210. Preferably, the lateral dimensions of cover plate 202 are slightly less than the lateral dimensions of shell 200, and a shallow recess is formed on the inside edges of the top surfaces of perimeter walls 212A-212D. Cover plate 202 is seated in this recess. Assembly posts 213 are positioned so as to protrude through recessed holes 234 of cover plate 202 by approximately 0.2 mm. A soldering iron or heat staking tool is then used to melt the plastic tips of assembly posts 213 and thereby form mushroom-shaped caps above recessed holes 234. Thus cover plate 202 is attached to shell 200 by mushroom caps on the tips of assembly posts 213. The melted plastic may be retained within the recesses around holes 234 to provide a substantially flat exterior surface of cartridge 20 on the side of cover plate 202.

The final step of the assembly process is to mount shutter 204 on the outside of shell 200 and cover plate 202. Since shutter 204 is made of a resilient sheet metal, protective flap 224 and clamping flap 226 can be separated slightly without permanently deforming shutter 204. Edge wall 228 of shutter 204 is made just wide enough to fit around the edge of shell 200. Shutter 204 is mounted with protective flap 224 within recess 230 of cover plate 202 and clamping flap within recess 214 of shell 200.

Figure 21:
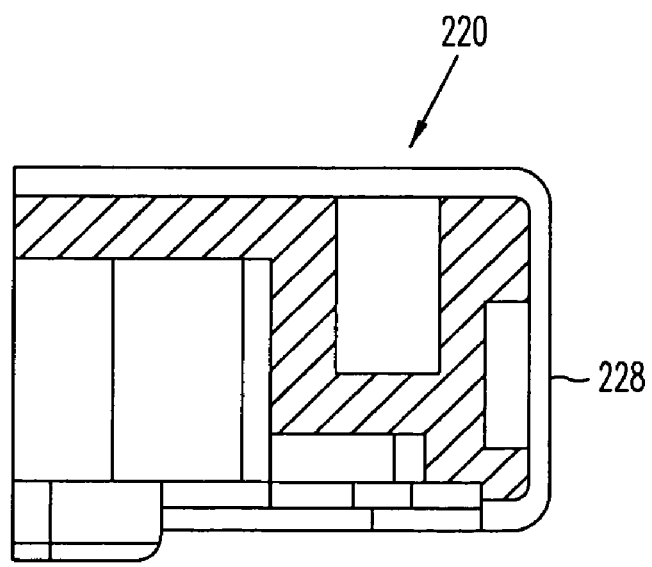
FIG. 21 is a cross-sectional view of the thick perimeter wall taken at section line 21-21 shown in FIG. 12A.

Referring back to FIG. 12A, shutter tracking groove 220 begins at leading edge 217 and extends part of the distance to trailing edge 218 of shell 220. Shutter tracking groove 220 is formed in perimeter wall 212D, and as noted above, perimeter wall 212D is made thicker than perimeter walls 212A-212C to accommodate groove 220. FIG. 21 is a cross-sectional view of perimeter wall 212D taken at section line 21-21 shown in FIG. 12A with shutter 204 in place. Shutter 204 is mounted such that tracking tabs 226A and 226B and latch tab 226C are free to slide in shutter tracking groove 220. Tracking tabs 226A and 226B are formed in a location on shutter 204 which allows shutter 204 to slide freely along the edge of shell 200, with minimal racking or "sloppiness."

With tracking tabs 226A and 226B and latch tab 226C inside groove 220, shutter 204 is mounted onto cartridge 20. As shutter 204 slides back and forth along groove 220, protective flap slides in recess 230 of cover plate 202, alternately opening and closing window 232. When window 232 is open, center hole 244 and a radial section of data area 250 are exposed, allowing center hole 244 to be engaged by a spindle motor and data to be read from data area 250. Similarly, as shutter 204 slides back and forth, clamping flap 226 slides back and forth in recess 214 of shell 200.

As described above, a window is formed in the side of groove 220 that separates groove 220 from latch cavity 207. The window extends only part of the way up from the floor 201 of shell 200. Hook 262 and release cam 264 protrude through this window into groove 220. As shown in FIG. 20B, hook 262 and release cam 264 do not extend across the entire thickness of latch 208. This allows hook 262 and release cam 264 to extend through the window and helps to securely position latch 208 within latch cavity 207.

Figure 27A:
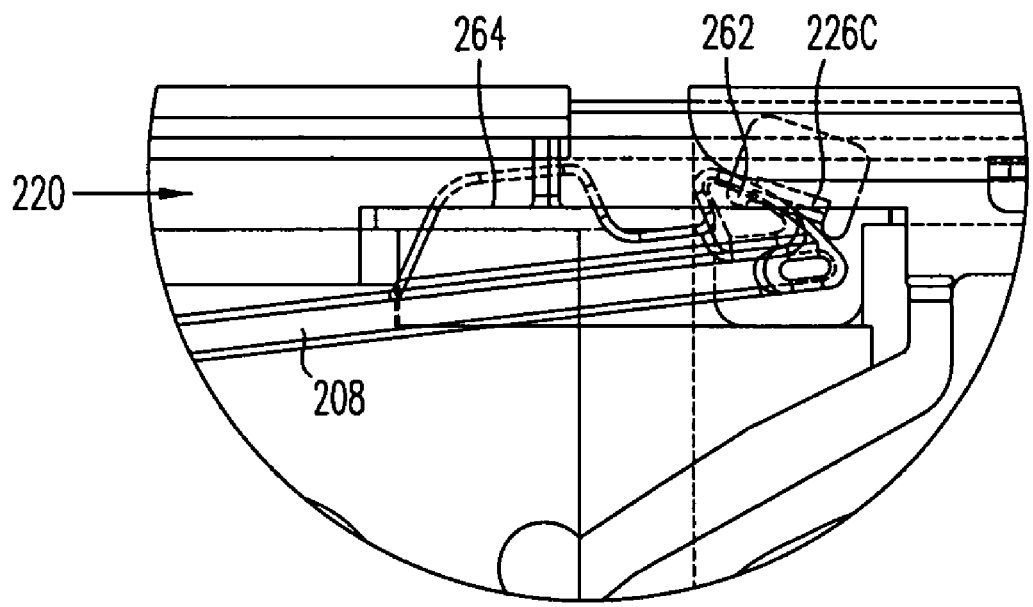
FIG. 27A shows the latch hook contacting the latch tab of the shutter as the shutter closes.
Figure 27B:
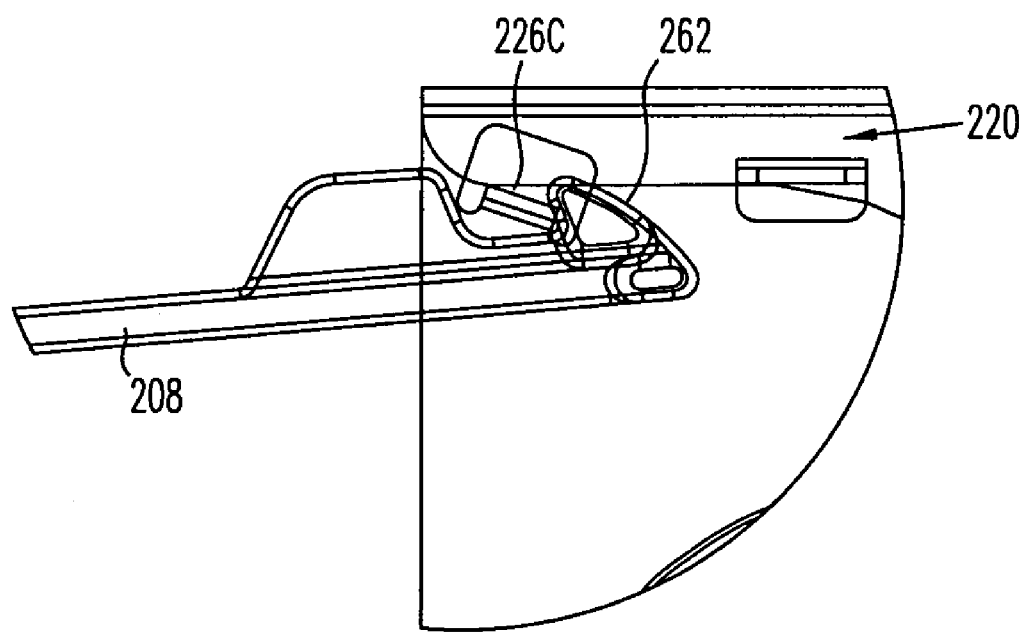
FIG. 27B shows the relative positions of the latch and the latch tab when the shutter is fully closed.

To complete the mounting of shutter 204, shutter 204 is slid along the edge of shell 200 in the direction of latch 208. As shutter 204 slides in groove 220, latch tab 226C (shown in FIG. 15B) also moves along groove 220. As shutter reaches the position in which protective flap 224 covers window 232, latch tab 226C makes contact with the cam surface 265 of hook 262. This is shown in FIG. 27A. This causes latch 208 to flex slightly and forces hook 262 back into the window. As shown in FIG. 27B, when latch tab 226C has passed by hook 262, latch 208 returns to its original configuration and latch tab 226C is constrained in notch 263 by the gripping surface 267 of hook 262. This locks shutter 204 in the position in which window 232 is closed, protecting the data area 250 of optical disc 240 from damage.

Figure 22:
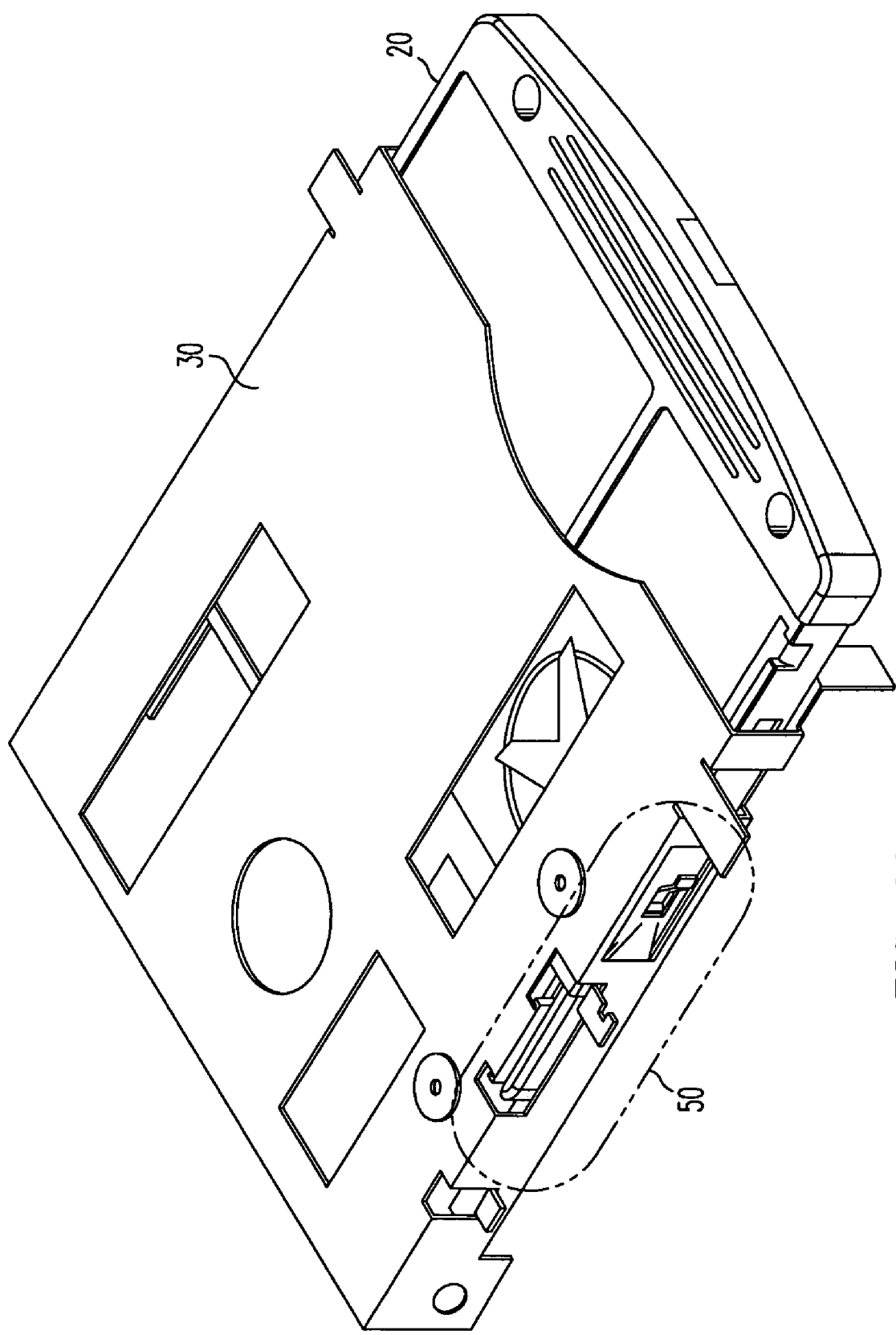
FIG. 22 is a general view of a cartridge according to the invention being inserted into a cartridge tray in a disc drive.
Figure 23A:
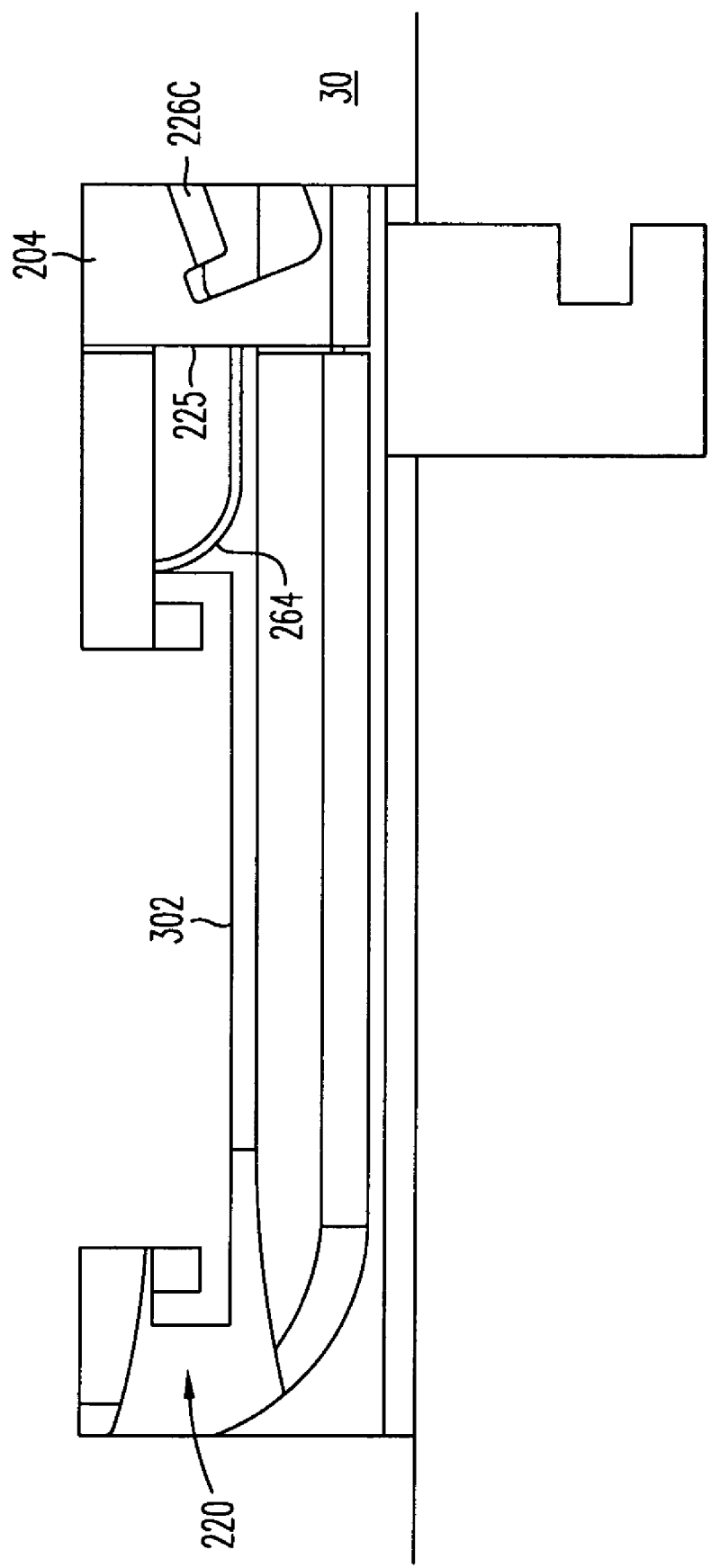
FIG. 23A is a top view of a portion of a cartridge tray, showing the mechanism for releasing the shutter as the cartridge is inserted into cartridge tray.
Figure 23B:
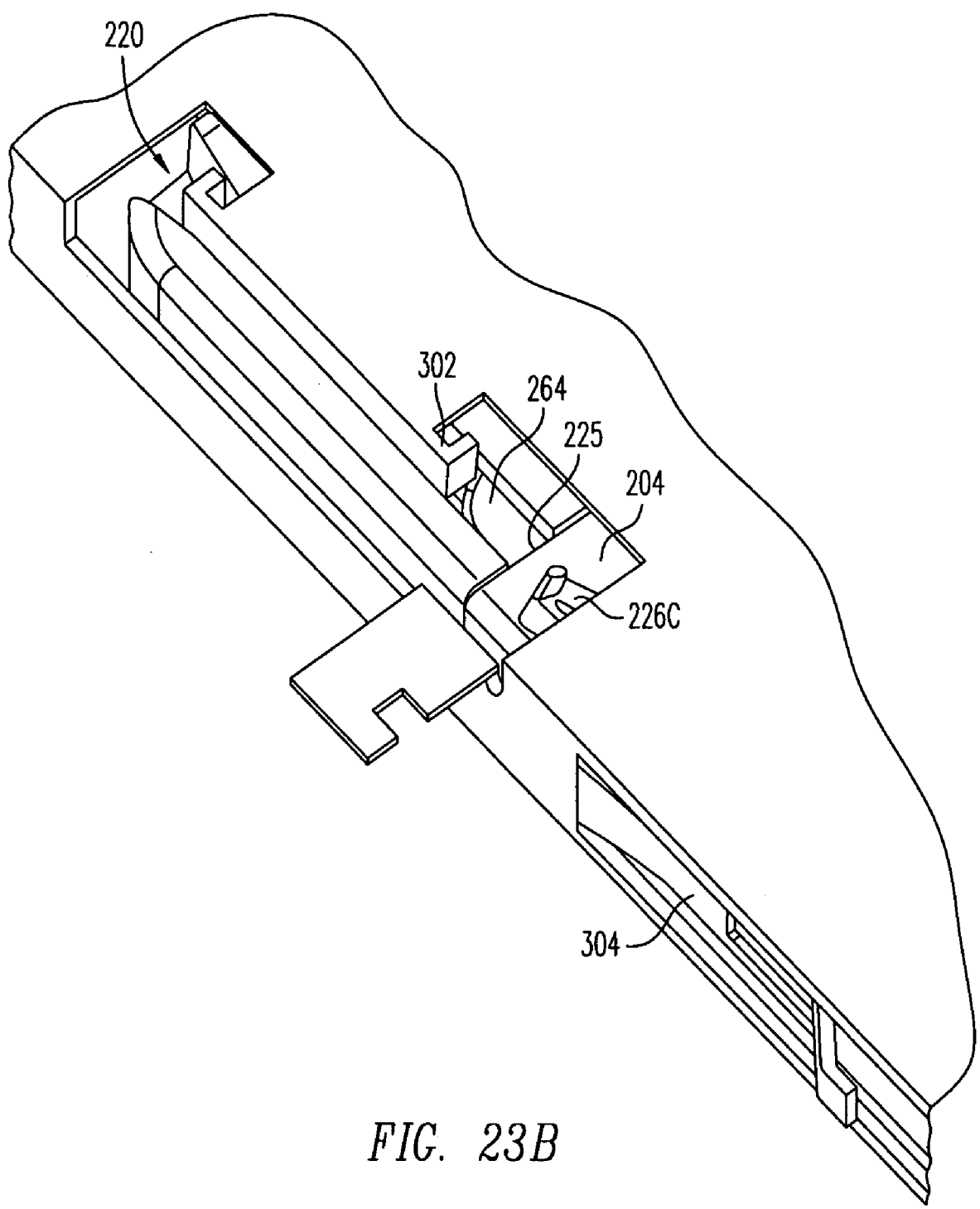
FIGS. 23B and 23C are perspective views of the same structure shown in FIG. 23A.
Figure 23C:
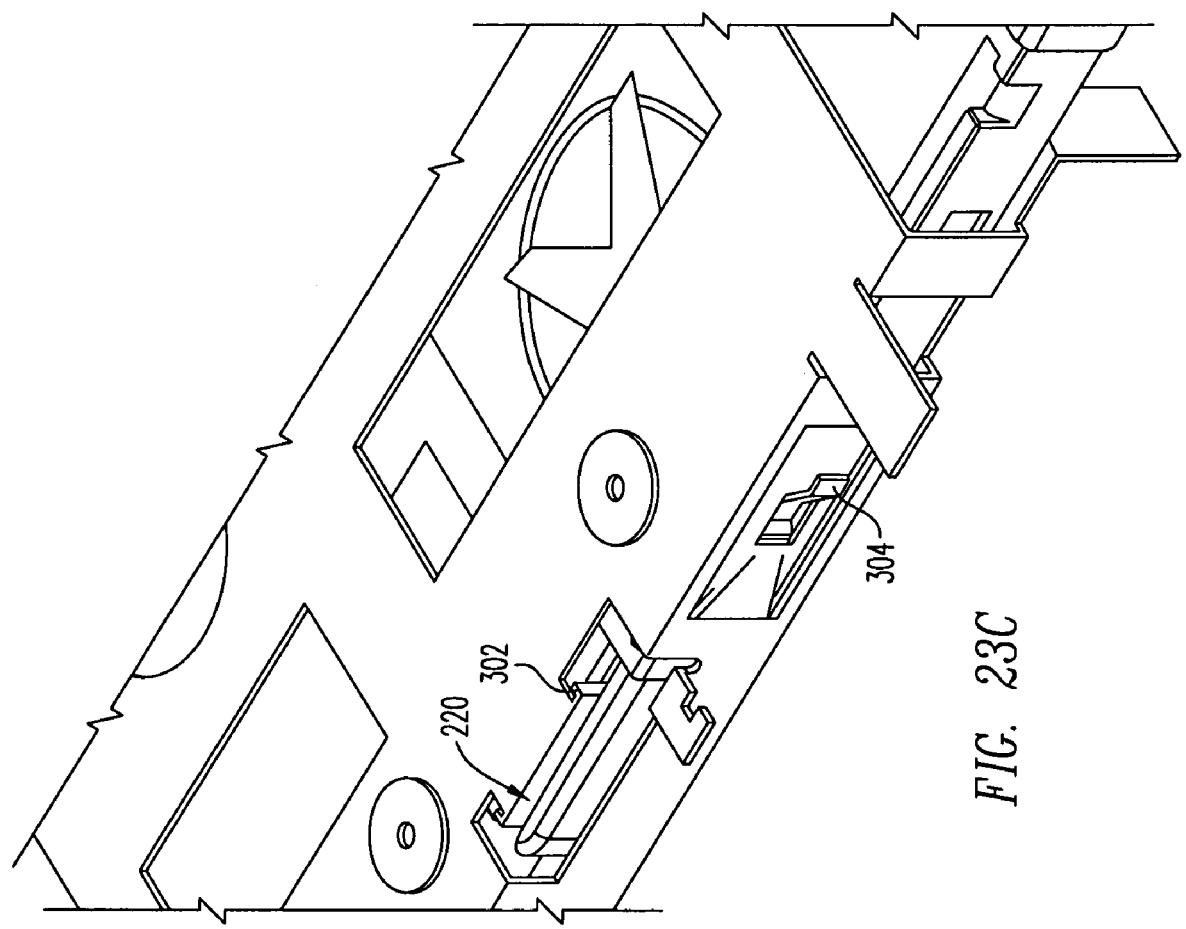

FIG. 22 is a general view of cartridge 20 being inserted into a cartridge tray 30 of a disc drive. FIGS. 23A-23C are detailed views of an area 50 of cartridge tray 30.

Figure 28A:
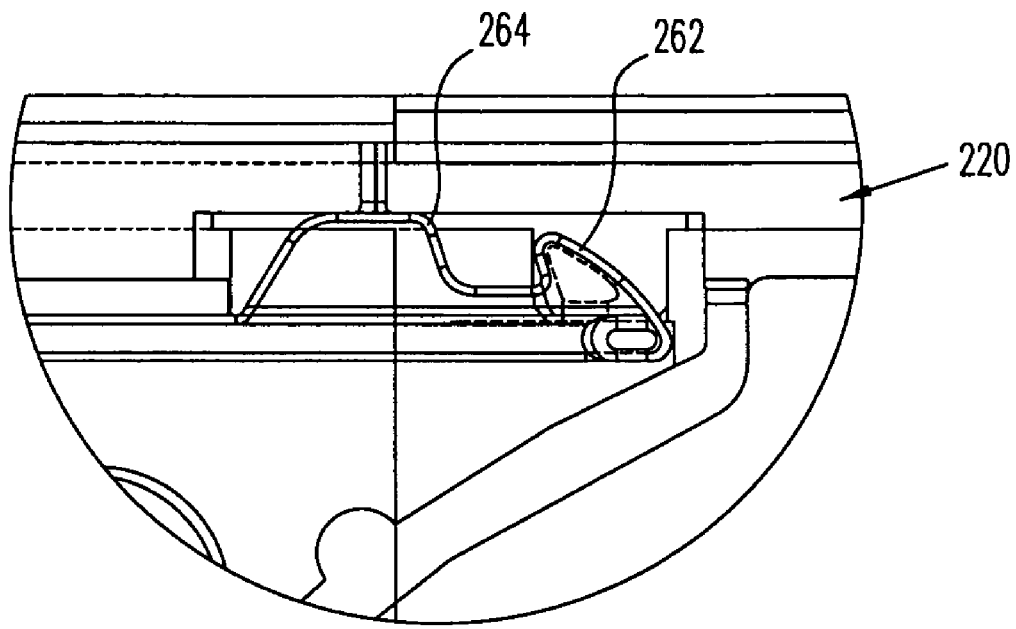
FIG. 28A shows the hook and the release cam retracted out of the shutter tracking groove when the release cam has been contacted by a feature of the disc drive as the cartridge is being inserted into the drive.
Figure 28B:
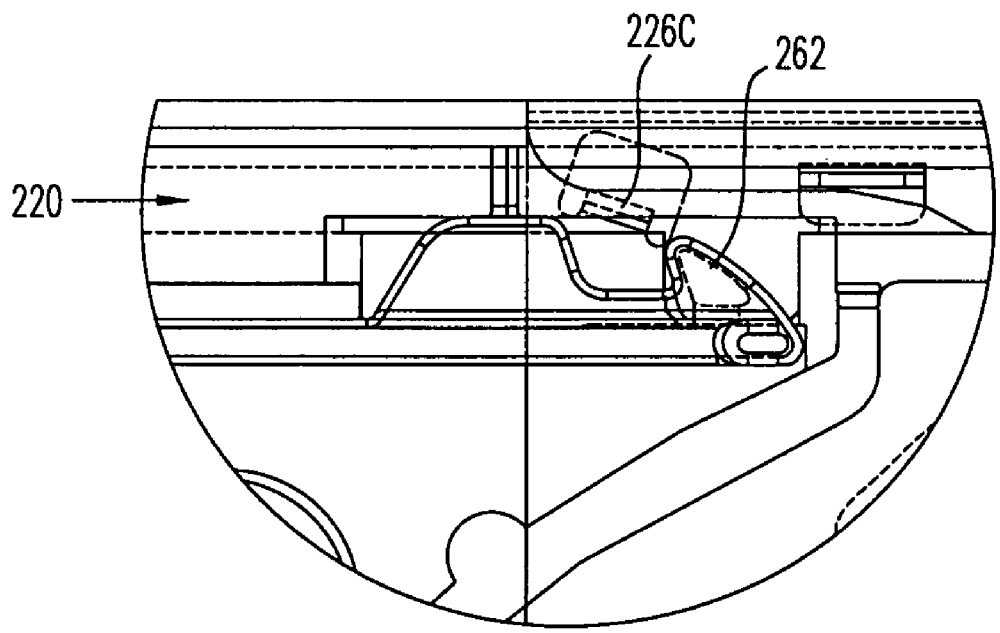
FIG. 28B shows how the hook of the latch is released from the latch tab in the condition shown in FIG. 28A.

FIG. 23A is a top view of area 50, showing the mechanism for releasing shutter 204 as cartridge 20 is inserted into cartridge tray 30. FIGS. 23B and 23C are perspective views of area 50. Cartridge tray 30 includes a feature, in this embodiment a blade 302, that projects downward into shutter tracking groove 220. After cartridge 20 has been inserted a short distance into cartridge tray 30, blade 302 comes into contact with leading edge 266 of release cam 264 and forces release cam 264 and hook 262 back into the window. See FIG. 28A. This releases latch tab 226C and frees shutter 204 to slide along the edge of cartridge 20. See FIG. 28B. Shortly thereafter, blade 302 abuts an edge 225 of shutter 204, and at approximately the same time a spring-loaded shutter insert 304 of cartridge tray 30 engages opening 229 in the edge wall 228 of shutter 204. As the user continues to slide cartridge 20 into cartridge tray 30, blade 302 holds shutter 204 stationary, so that shutter 204 slides along the edge of cartridge 20 to open window 232 of cover plate 202. When cartridge 20 has been fully inserted into cartridge try 30, a feature (not shown) of the disc drive engages recess 209 (FIG. 12C), holding cartridge 20 securely in cartridge tray 30.

When the user wishes to remove cartridge 20 from the disc drive, the user pushes a button on the disc drive which causes the feature to retract from recess 209. A spring mechanism in the disc drive forces cartridge 20 partially out of cartridge tray 30, exposing the portion of cartridge adjacent trailing edge 218. As the user manually removes cartridge 20 from cartridge tray 30, shutter insert 304 remains in opening 229 of shutter 204 until shutter 204 is fully closed and engaged by hook 262. Shutter insert 304 then lifts from opening 229 as the user continues to remove cartridge 20 from the disc drive.

Figure 24:
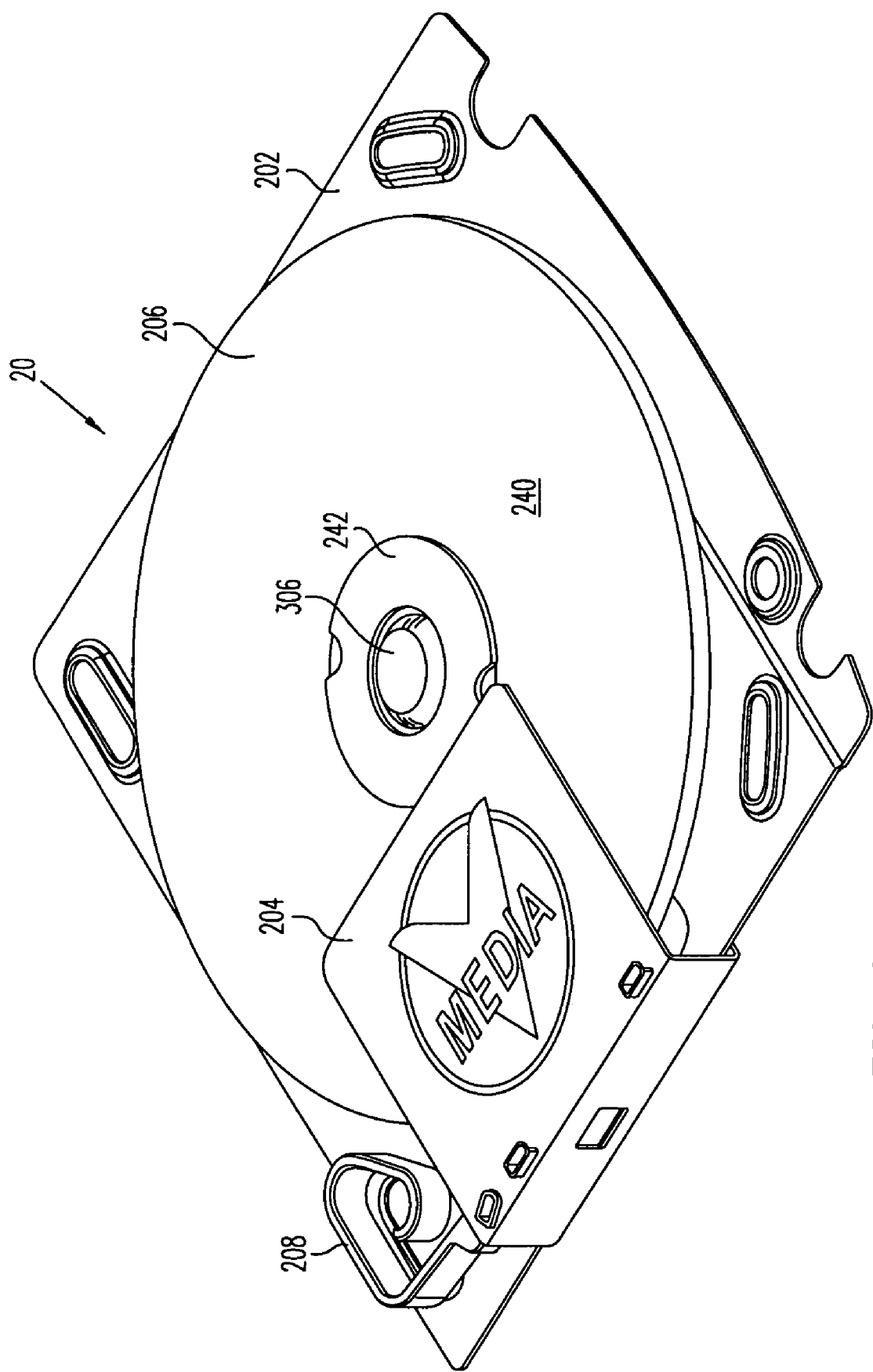
FIGS. 24-26 are views showing how a spindle motor shaft engages the center hole of disc assembly.
Figure 25:
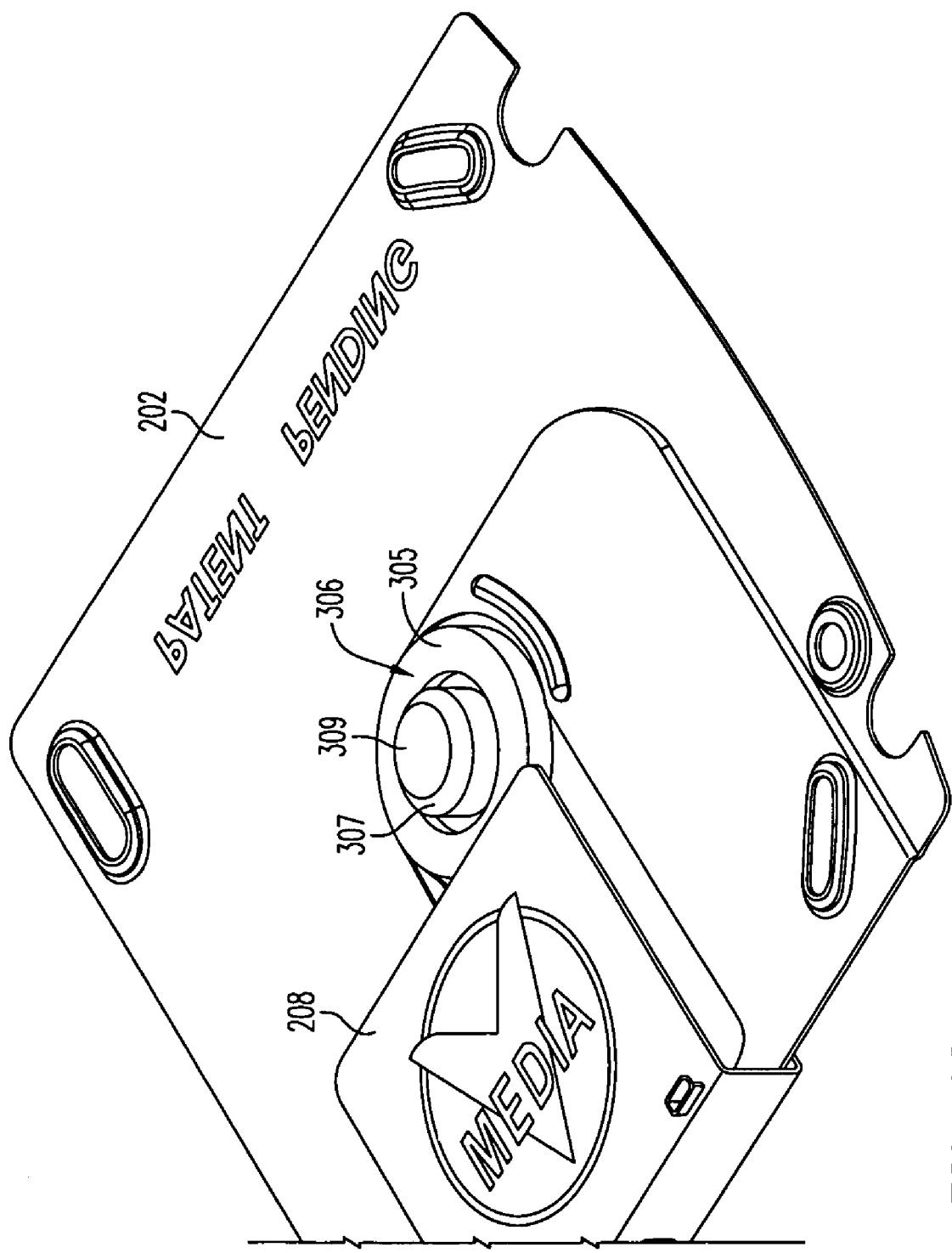
Figure 26:
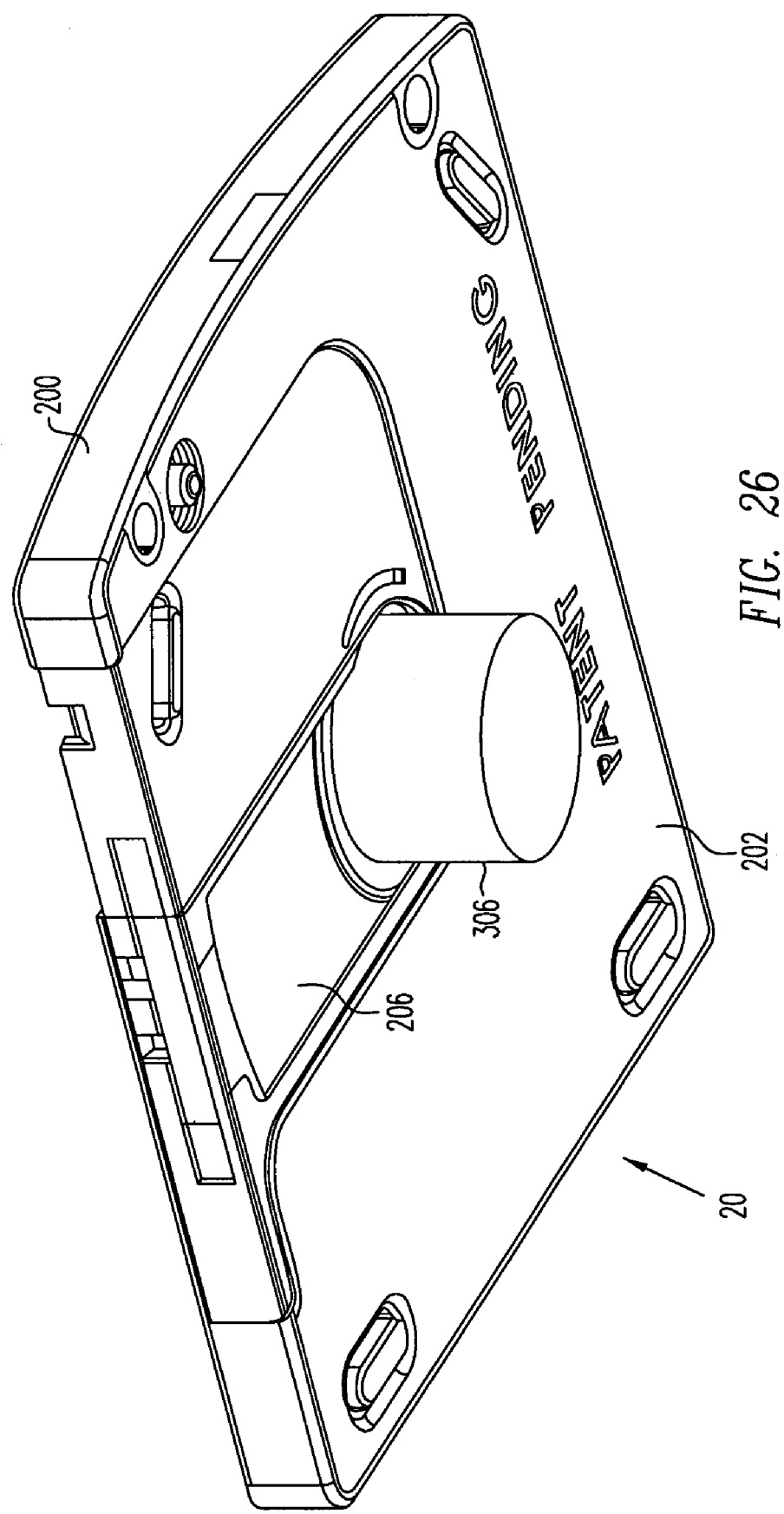

FIGS. 24-26 are cutaway views that show how a spindle motor shaft 306 engages center hole 244 of disc assembly 206. FIG. 24 is a view of cartridge 20 oriented as it would be during this process with shell 200 removed. FIG. 25 is a similar view with disc assembly 206 removed. FIG. 26 is a view from the underside of cartridge 20 when cartridge has been fully loaded into a disc drive.

As shown in FIG. 25, spindle motor shaft 306 contains an annular clamp magnet 305, which is recessed from a protruding end portion 309 of spindle motor shaft 306. Clamp magnet 305 can be made of a permanent magnetic material such as NiFe or NiCrFe. As shown in FIG. 24, when cartridge 20 is fully inserted into a disc drive, spindle motor shaft 306 moves upward so as to insert protruding end portion 309 into center hole 244. A tapered surface 307 on protruding end portion 309 helps to guide protruding end portion 309 into center hole 244. Center hole 244 can have a diameter of 4.010-4.022 mm and is tightly toleranced with respect to protruding end portion 309. As protruding end portion 309 enters center hole 244, clamp magnet 305 attracts or pulls down on magnetic retainer ring 242 which, as described above, is glued onto the non-data side of optical disc 240. Two alignment posts (not shown) in the disc drive fit into alignment holes 222A and 222B to assure that cartridge 20 is accurately and repeatably positioned in the disc drive.

The embodiments of this invention described above are illustrative and not limiting. Many alternative embodiments within the broad scope of this invention will be apparent to those of skill in the art.

We claim:

1. A method of fabricating a cartridge for an optical data storage disc comprising:
   providing a plastic shell, the plastic shell having a disc cavity, the disc cavity bounded by a floor and lateral walls, the lateral walls laterally surrounding the disc cavity, the plastic shell further comprising a plurality of plastic assembly posts;
   providing a sheet metal cover sheet having a plurality of holes;
   placing an optical data storage disc in the disc cavity;
   placing the sheet metal cover sheet adjacent the plastic shell so as to enclose the optical data storage disc in the disc cavity, each of the assembly posts projecting through one of the holes; and heating an end portion of each of the assembly posts to form a cap which holds the sheet metal cover against the plastic shell.

2. The method of claim 1 comprising fitting a shutter around an edge of the shell.

3. The method of claim 1 wherein heating an end portion of each of the assembly posts comprising heating with an iron.

4. The method of claim 1 wherein heating an end portion of each of the assembly posts comprising heating with an ultrasonic tool.

5. The method of claim 1 comprising gluing a magnetic retainer ring to the optical data storage disc.

6. The method of claim 1 wherein in the plastic shell the floor adjoins the lateral walls and occupies the entire area enclosed by the lateral walls.

* * * * *